US012647638B2

(12) United States Patent
Wang et al.

(10) Patent No.: US 12,647,638 B2
(45) Date of Patent: Jun. 2, 2026

(54) SUPPORT INTERACTION METHOD AND ELECTRONIC DEVICE

(71) Applicant: BEIJING BYTEDANCE NETWORK TECHNOLOGY CO., LTD., Beijing (CN)

(72) Inventors: Haiqian Wang, Beijing (CN); Yijie Li, Beijing (CN); Rongrong Zheng, Beijing (CN); Linxing Li, Beijing (CN); Wen Ruan, Beijing (CN); Xuyuan Xiang, Beijing (CN); Yanran Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/550,200

(22) PCT Filed: Mar. 8, 2022

(86) PCT No.: PCT/CN2022/079656
§ 371 (c)(1),
(2) Date: Sep. 12, 2023

(87) PCT Pub. No.: WO2022/188761
PCT Pub. Date: Sep. 15, 2022

(65) Prior Publication Data
US 2024/0163498 A1      May 16, 2024

(30) Foreign Application Priority Data
Mar. 12, 2021      (CN) .......................... 202110271921.1

(51) Int. Cl.
*H04N 21/431* (2011.01)
*H04N 21/4788* (2011.01)

(52) U.S. Cl.
CPC ..... *H04N 21/4312* (2013.01); *H04N 21/4788* (2013.01)

(58) Field of Classification Search
CPC ........... H04N 21/4312; H04N 21/4788; H04N 21/431; G06F 3/0481; G06F 3/04817; G06F 3/0484
See application file for complete search history.

(56) References Cited

U.S. PATENT DOCUMENTS

2018/0160180 A1 *   6/2018   Kedenburg, III .. H04N 21/4753
2018/0310043 A1 *  10/2018   Wang ................ H04N 21/44224
2020/0336718 A1 *  10/2020   Yoon ..................... G06F 40/169

FOREIGN PATENT DOCUMENTS

CN          103997691 A       8/2014
CN          105376654 A       3/2016
(Continued)

OTHER PUBLICATIONS

International Search Report (with English translation) and Written Opinion issued in PCT/CN2022/079656, dated May 17, 2022, 12 pages provided.

*Primary Examiner* — Nathan J Flynn
*Assistant Examiner* — Christine A Kurien
(74) *Attorney, Agent, or Firm* — Astute IP Law Group

(57)          ABSTRACT
A support interaction method and an electronic device are provided. The method comprises: displaying a playing interface of a video program in an application program; after a first object in the video program appears in the playing interface, displaying a first component, wherein the first component is used for supporting the first object within a first time period, and the first time period is a time period within which the first object played on the playing interface appears in the video program; within the first time period, receiving a first operation executed by a user on the first component; and in response to receiving the first operation,
(Continued)

displaying, in the first component, the number of supports
from the user for the first object.

20 Claims, 18 Drawing Sheets

(56) References Cited

FOREIGN PATENT DOCUMENTS

| | | | |
|---|---|---|---|
| CN | 106210808 | A | 12/2016 |
| CN | 107172477 | A | 9/2017 |
| CN | 108737906 | A | 11/2018 |
| CN | 110225388 | A | 9/2019 |
| CN | 110337023 | A | 10/2019 |
| CN | 110392274 | A | 10/2019 |
| CN | 111711831 | A | 9/2020 |

* cited by examiner

11

11

12

12

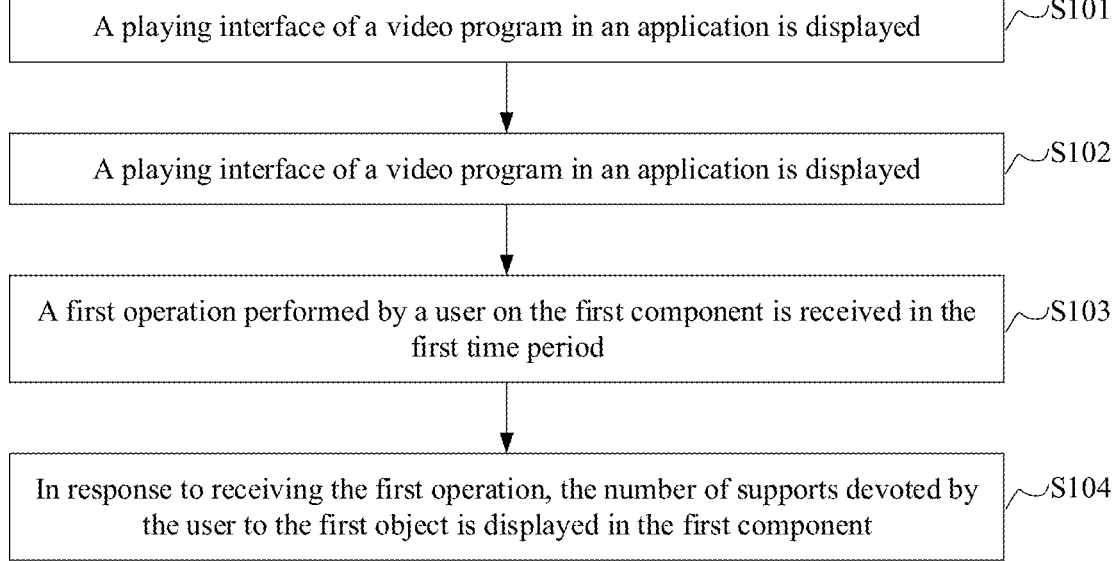

A playing interface of a video program in an application is displayed        ~S101

A playing interface of a video program in an application is displayed        ~S102

A first operation performed by a user on the first component is received in the first time period        ~S103

In response to receiving the first operation, the number of supports devoted by the user to the first object is displayed in the first component        ~S104

Figure 2

SUPPORT INTERACTION METHOD AND ELECTRONIC DEVICE

This application is the national phase of International Patent Application No. PCT/CN2022/079656 filed on Mar. 8, 2022, which claims priority to Chinese patent application No. 202110271921.1, titled "SUPPORT INTERACTION METHOD AND ELECTRONIC DEVICE", filed on Mar. 12, 2021 with the China National Intellectual Property Administration, both of which are incorporated herein by reference in their entireties.

FIELD

The present disclosure relates to the field of Internet technology, and in particular to a support interaction method and an electronic device.

BACKGROUND

With the continuous development of Internet technology, a user may enjoy video programs such as movies, TV series, variety shows or song performance through various ways. In order to improve the enthusiasm of the user to watch the video program, an interaction activity with the user may be carried out while displaying the video program, so that the user may really participate in the video program.

Therefore, how to carry out an in-depth interaction with the user in the video program is an urgent problem to be solved.

SUMMARY

In order to solve the above technical problem or at least partially solve the above technical problem, a support interaction method and an electronic device are provided according to the present disclosure.

In a first aspect, a support interaction method is provided according to the present disclosure. The method includes: displaying a playing interface of a video program in an application; in response to a first object in the video program appearing in the playing interface, displaying a first component, where the first component is configured to devote support to the first object in a first time period, and the first time period is a time period in which appearance of the first object in the video program is played in the playing interface; in the first time period, receiving a first operation performed by a user on the first component; and in response to receiving the first operation, displaying the number of supports devoted by the user to the first object in the first component.

In a possible design, the method further includes: displaying a support cumulative result and a ranking of the first object in the first component.

In a possible design, the method further includes: in a case that the number of times that the user consecutively performs the first operation on the first component is within a preset range, displaying the first component in an effect corresponding to the preset range.

In a possible design, the method further includes: displaying a first control; receiving a second operation performed by the user on the first control; and in response to the second operation, displaying a leaderboard interface, where the leaderboard interface includes support cumulative results and rankings of all objects who have appeared in played segments of the video program.

In a possible design, the method further includes: displaying a second control on the leaderboard interface, where the second control is configured to devote support to the first object in a second time period, and the second time period is a support time period of the video program; in the second time period, receiving a third operation performed by the user on the second control; and in response to the third operation, updating the support cumulative result and the ranking of the first object in the leaderboard interface.

In a possible design, the method further includes: displaying a third control on the leaderboard interface, where the third control is configured to associate with a social account of the first object beyond a second time period, and the second time period is a support time period of the video program; beyond the second time period, receiving a fourth operation performed by the user on the third control; and in response to the fourth operation, associating with the social account of the first object in the application.

In a possible design, the displaying a first component includes: displaying the playing interface in a first area and displaying the first component in a second area, where the first area and the second area do not overlap with each other.

In a possible design, the method further includes: displaying a comment content of a user who has watched the video program in the second area.

In a possible design, the displaying a first component includes: displaying the playing interface in full screen and displaying the first component on the playing interface.

In a possible design, the first component includes a third area and a fourth control; the third area is configured to display an avatar of the first object, a name of the first object and a name of a performance content of the first object; and the fourth control is configured to devote support to the first object in the first time period and display the remaining number of supports of the user.

In a possible design, the first component includes a fourth area and a fifth control; the fourth area is configured to display an avatar of the first object, a name of the first object, a name of a performance content of the first object and a support cumulative result of the first object; and the fifth control is configured to devote support to the first object in the first time period and display the remaining number of supports of the user.

In a second aspect, an electronic device is provided according to the present disclosure. The electronic device includes a memory and a processor. The memory is configured to store program instructions. The processor is configured to call the program instructions in the memory to cause the electronic device to perform the support interaction method in the first aspect and any possible design of the first aspect.

In a third aspect, a computer storage medium including computer instructions is provided according to the present disclosure. The computer instructions, when executed on an electronic device, cause the electronic device to perform the support interaction method in the first aspect and any possible design of the first aspect.

In a fourth aspect, a computer program product is provided according to the present disclosure. The computer program product, when executed on a computer, causes the computer to perform the support interaction method in the first aspect and any possible design of the first aspect.

In a fifth aspect, a chip system including a processor is provided according to the present disclosure. When the processor performs computer instructions stored in a memory, the processor performs the support interaction method in the first aspect and any possible design of the first aspect.

BRIEF DESCRIPTION OF THE DRAWINGS

The drawings herein are incorporated into the specification and constitute a part of the specification. The drawings show embodiments of the present disclosure. The drawings and the specification are intended to explain the principle of the present disclosure.

In order to more clearly illustrate the embodiments of the present disclosure or the technical solutions in the conventional art, the drawings used in the description of the embodiments or the conventional art are briefly introduced below. It is apparent that, for those skilled in the art, other drawings can be obtained according to the provided drawings without any creative effort.

FIG. 2 is a schematic flowchart of a support interaction method according to an embodiment of the present disclosure.

DETAILED DESCRIPTION OF EMBODIMENTS

Figure 1A:
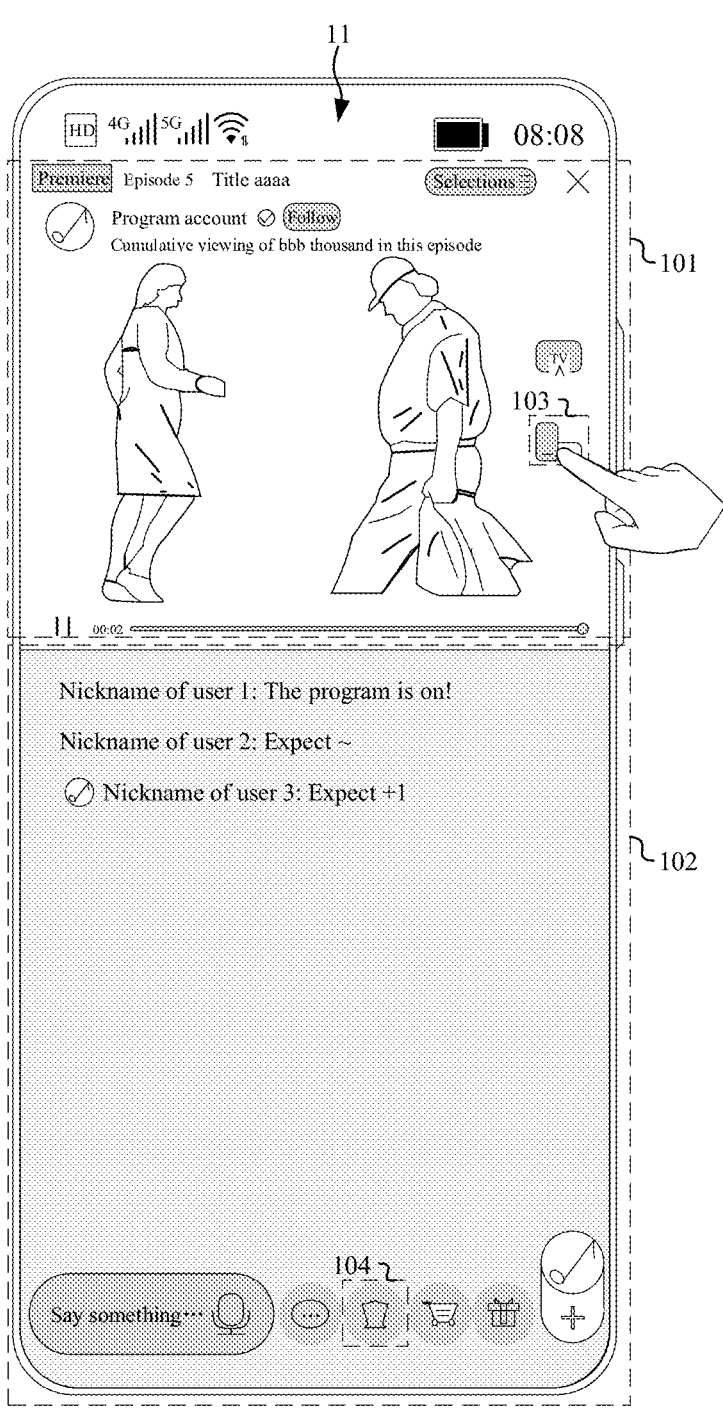
FIGS. 1A to 1U are schematic diagrams of human-computer interaction interfaces according to embodiments of the present disclosure.

In order to more clearly understand the above objects, features and advantages of the present disclosure, the solutions of the present disclosure will be further described hereinafter. It should be noted that the embodiments of the present disclosure and the features in the embodiments may be combined with each other in the case of no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

Exemplarily, a support interaction method, an electronic device, a computer storage medium and a computer program product are provided according to the present disclosure. A support (i.e., voting) entry is associated with a playing content of a video program. During the playing process of the video program, the appearance of the support entry may be triggered in real time as an object appears and the disappearance of the support entry may be triggered in real time as the object disappears. Therefore, based on the support entry, a user may support the object during a playing time period of the object, and support data of the object may be displayed in real time, so that an influence of a support operation of the user on the video program may be timely fed back. Therefore, while playing the video program, the opening or disappearance of the support entry for the object may be triggered in match with the appearance time period of the object, so that the user may support the object online, thus achieving a close interaction between the user and the video program, which improves the timeliness of the interaction when the user watches the video program.

In addition, based on the number of continuous interaction operations by the user, an interaction special effect corresponding to the support entry may be displayed in real time.

In addition, based on refreshing support data of objects in all client devices in time, support cumulative results and rankings of all objects may be displayed, thus avoiding the information lag of operations in different scenarios.

A support interaction method according to the present disclosure is performed by an electronic device. The electronic device may be a tablet computer, a mobile phone (such as a folding screen mobile phone, a large screen mobile phone or the like), a wearable device, a vehicle-mounted device, an augmented reality (AR)/virtual reality (VR) device, a notebook computer, an ultra-mobile personal computer (UMPC), a netbook, a personal digital assistant (PDA), a smart TV, a smart screen, a high-definition TV, a 4K TV, a smart speaker, a smart projector or other internet of things (IOT) devices. A specific type of the electronic device is not limited in the present disclosure.

A type of an operating system of the electronic device is not limited in the present disclosure. The operating system may be, for example, Android system, Linux system, Windows system, iOS system and the like.

Based on the foregoing description, the support interaction method according to the present disclosure is described in detail in combination with the drawings and application scenarios by taking the electronic device as an example.

Figure 1B:
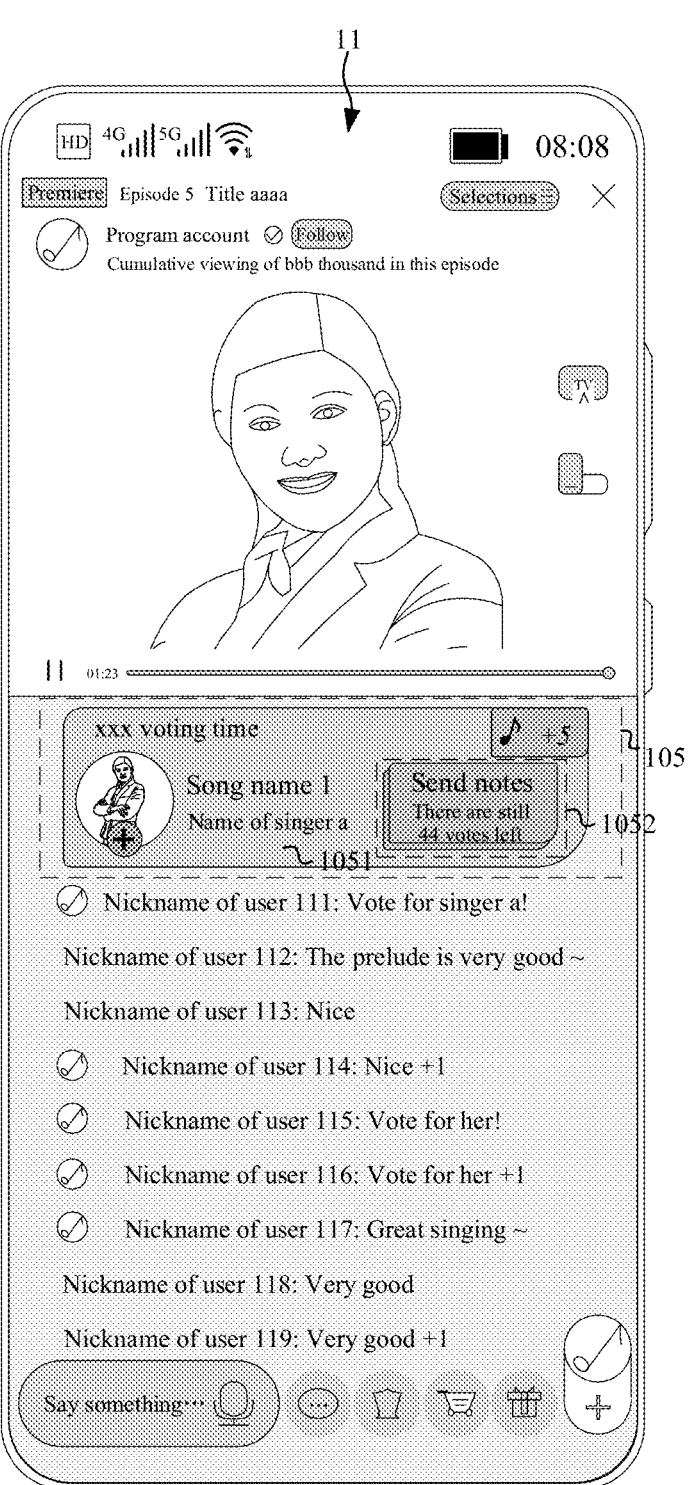
Figure 1C:
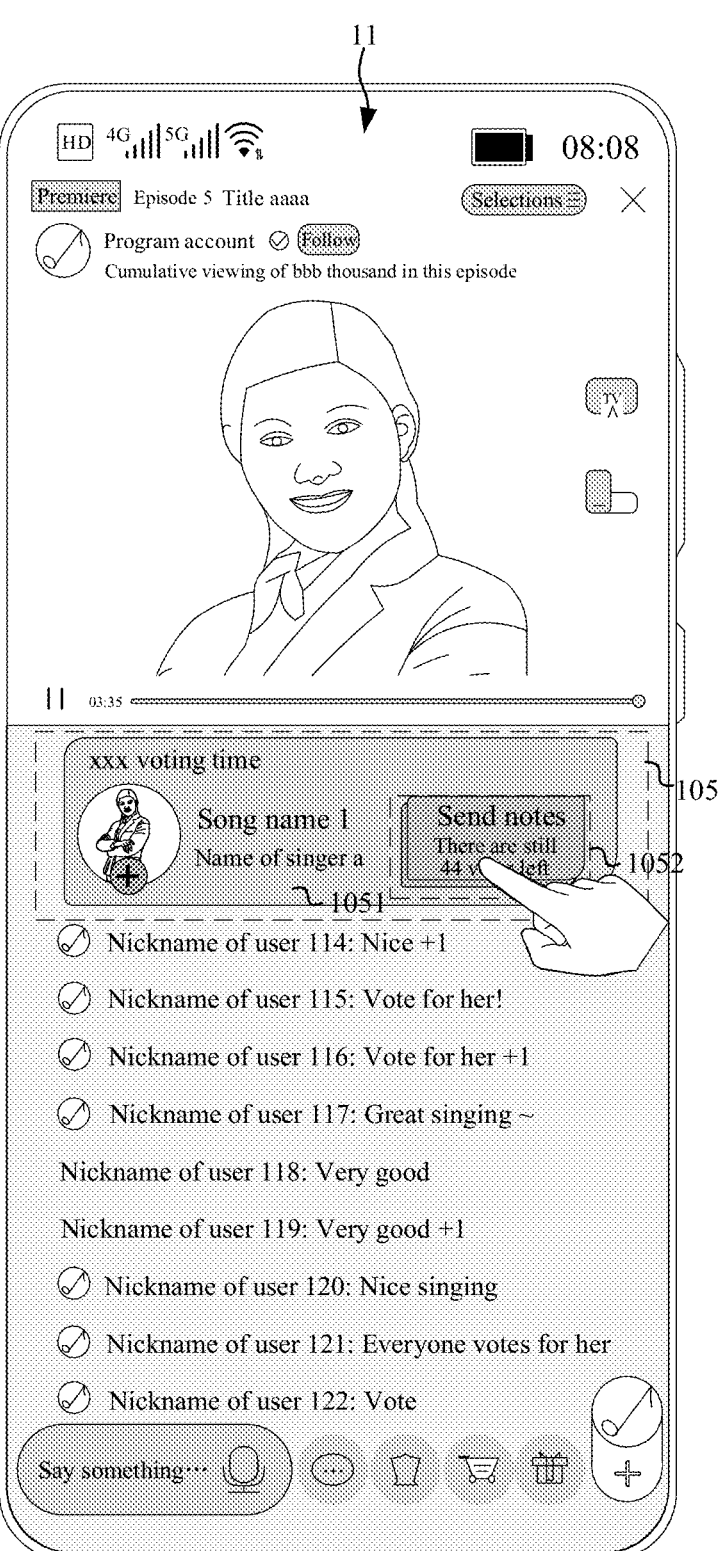
Figure 1D:
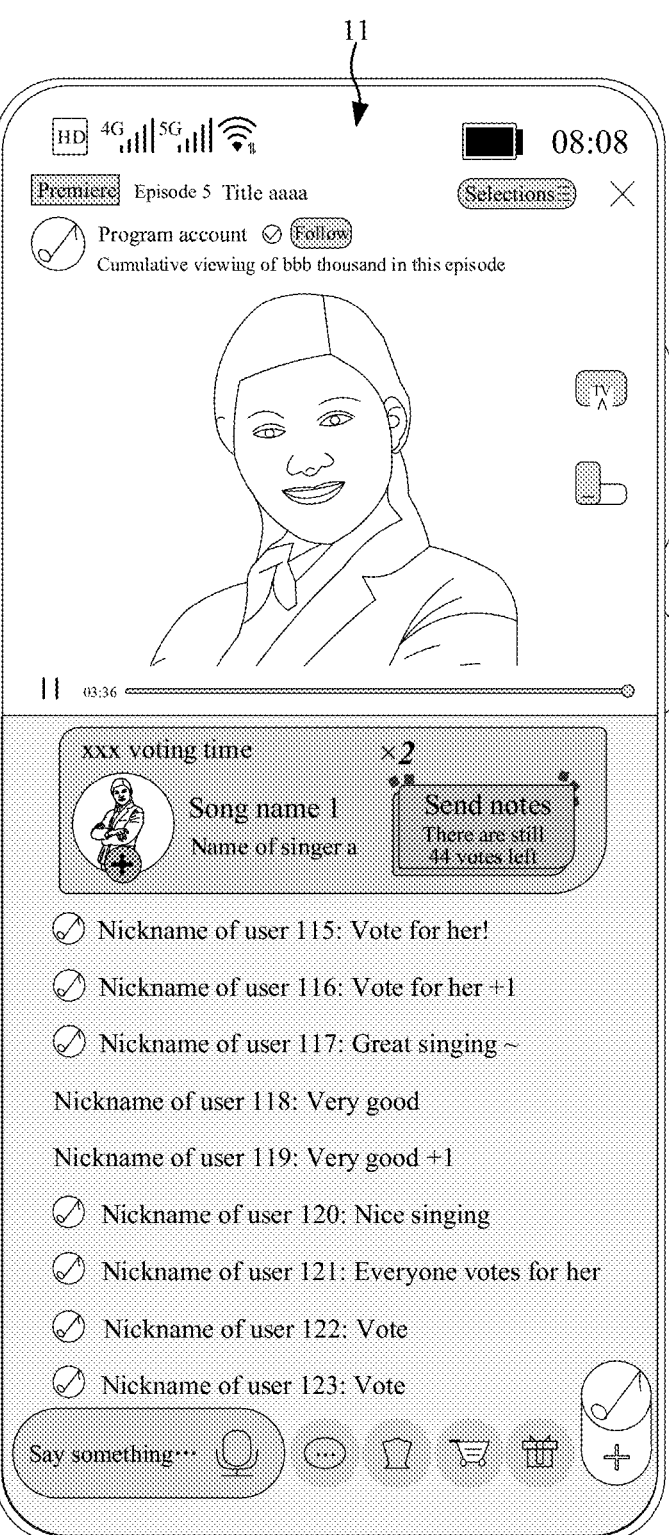
Figure 1E:
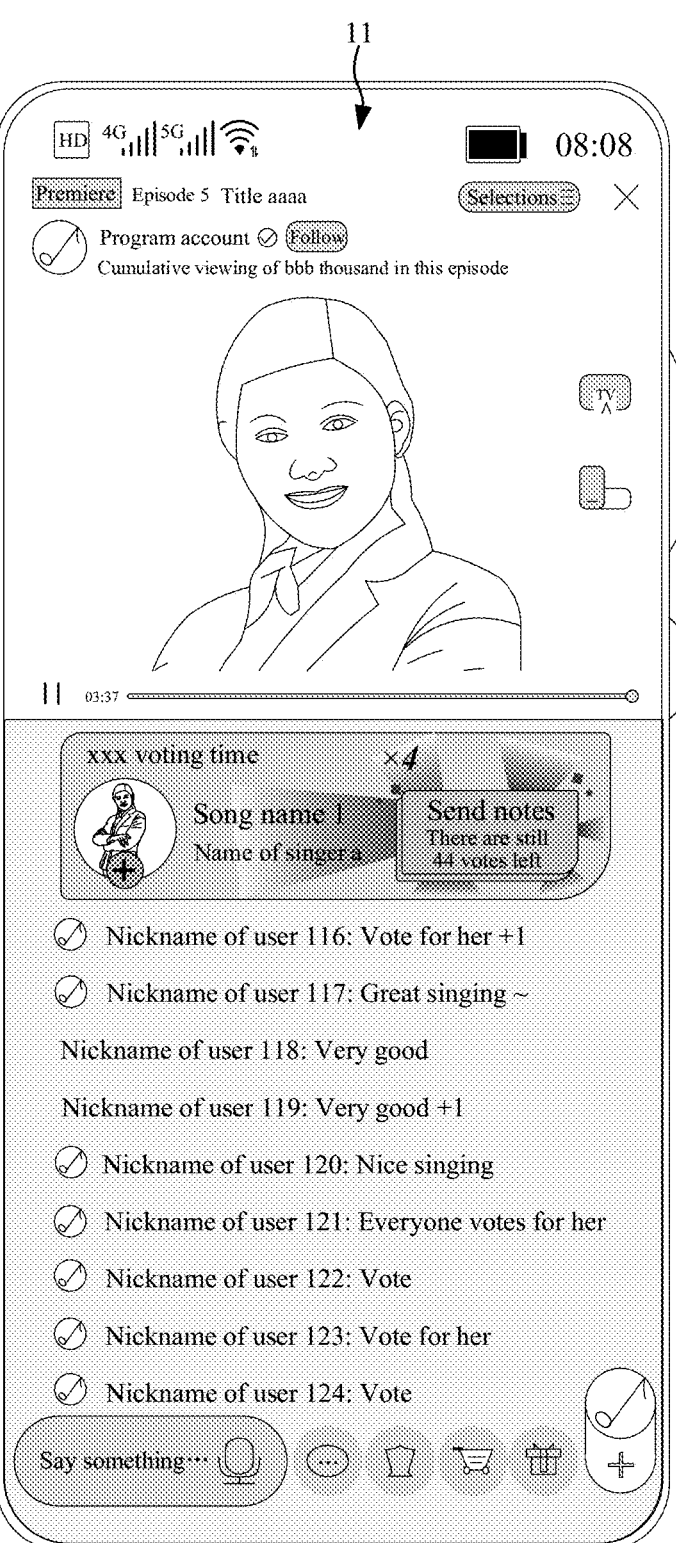
Figure 1F:
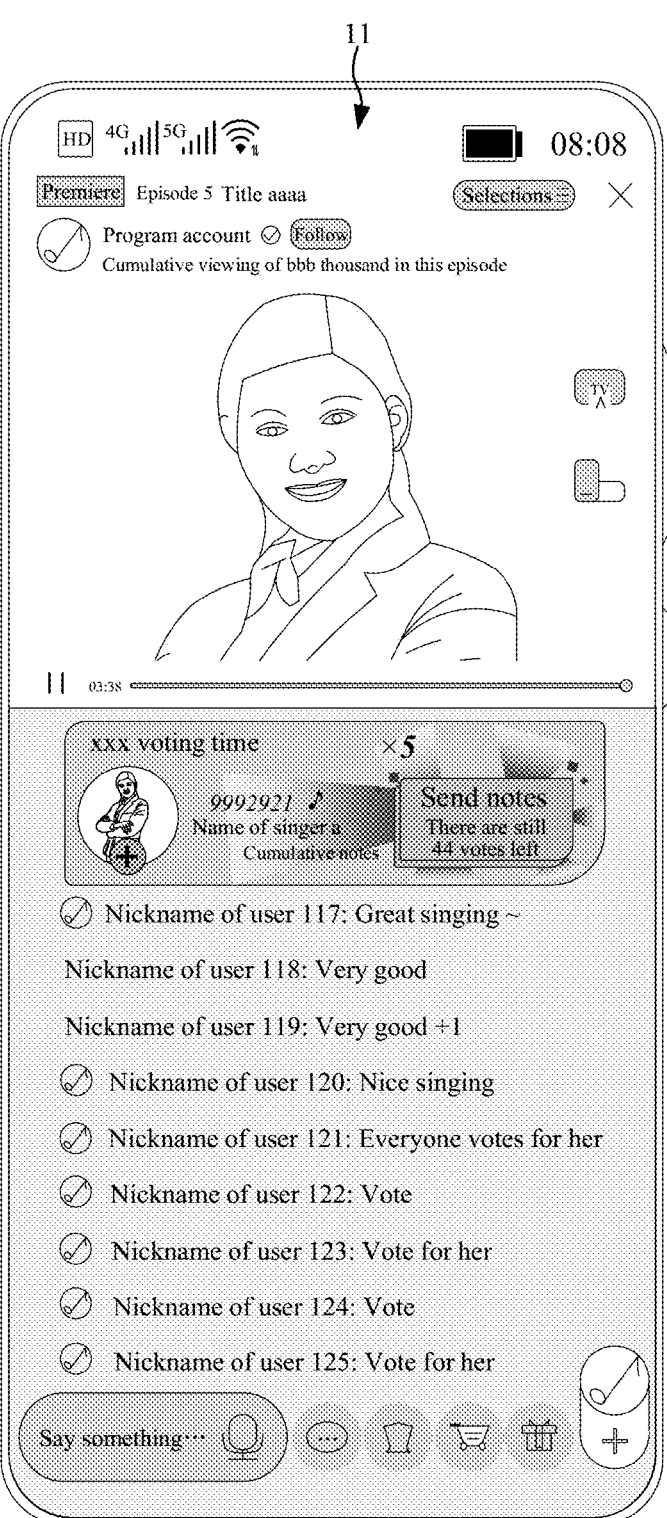
Figure 1G:
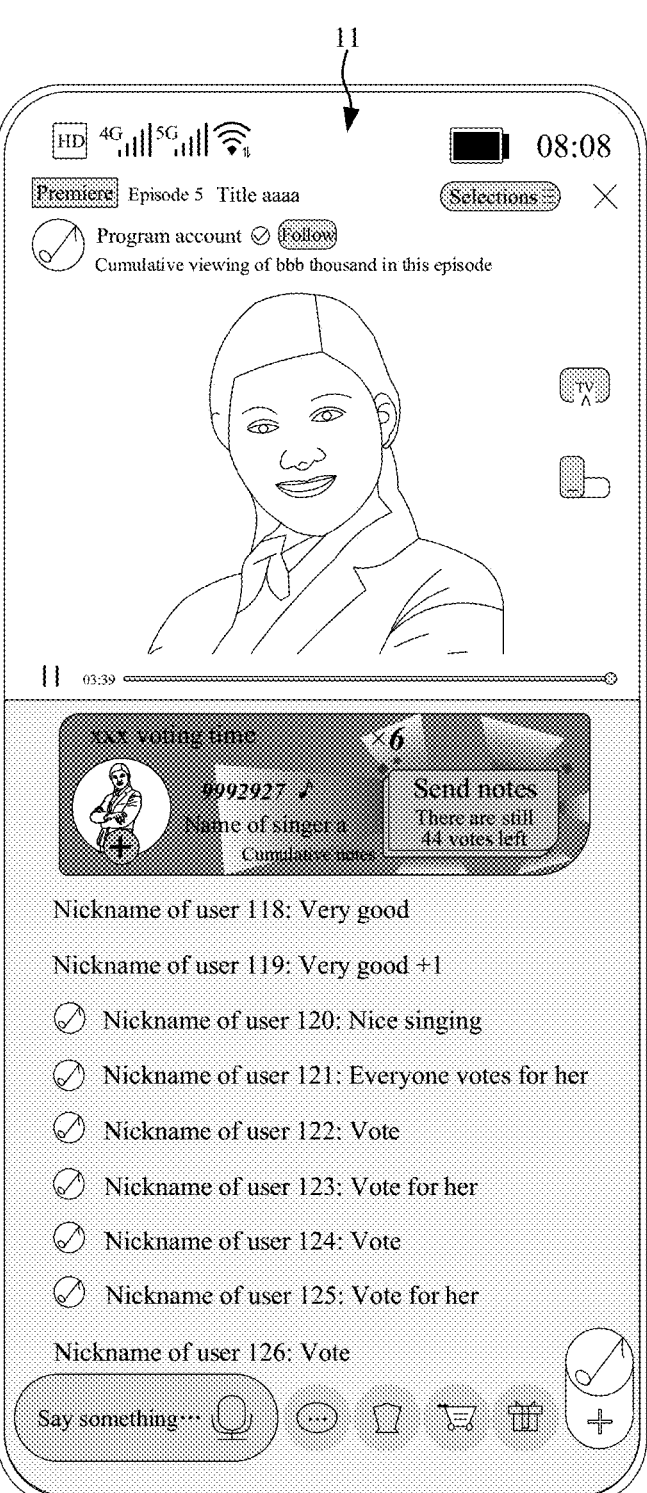
Figure 1H:
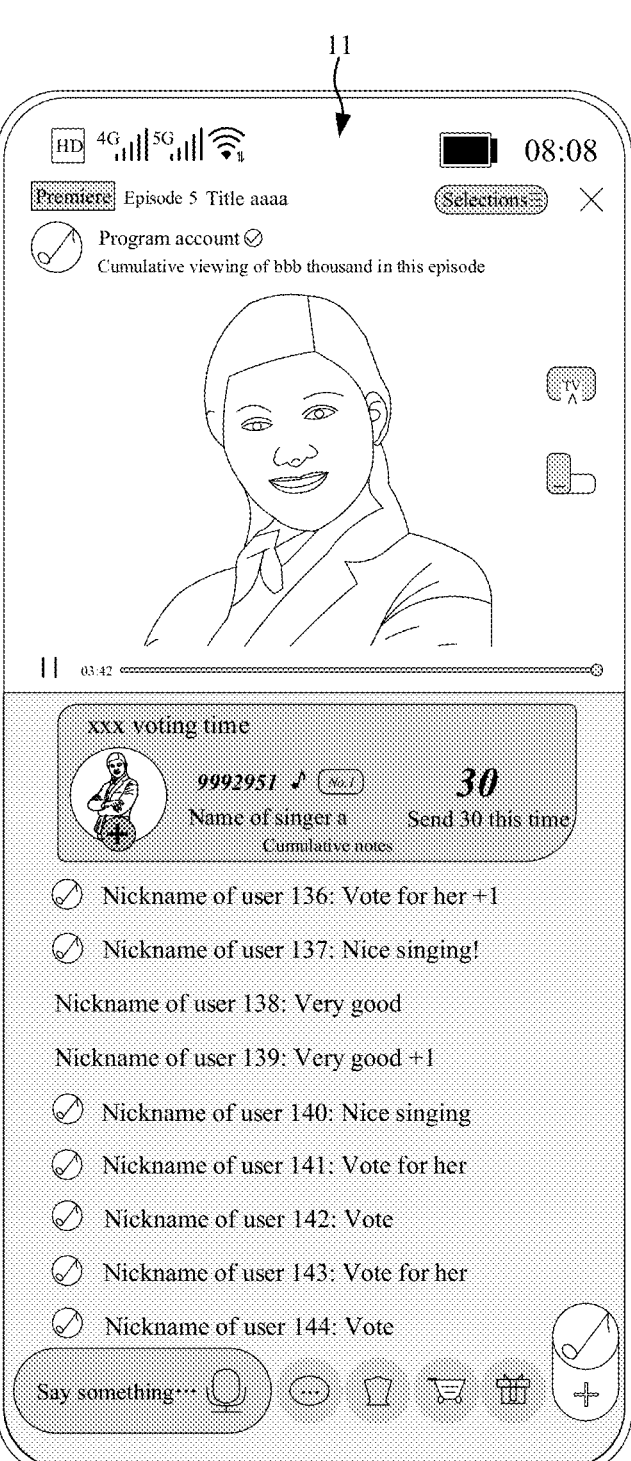
Figure 1I:
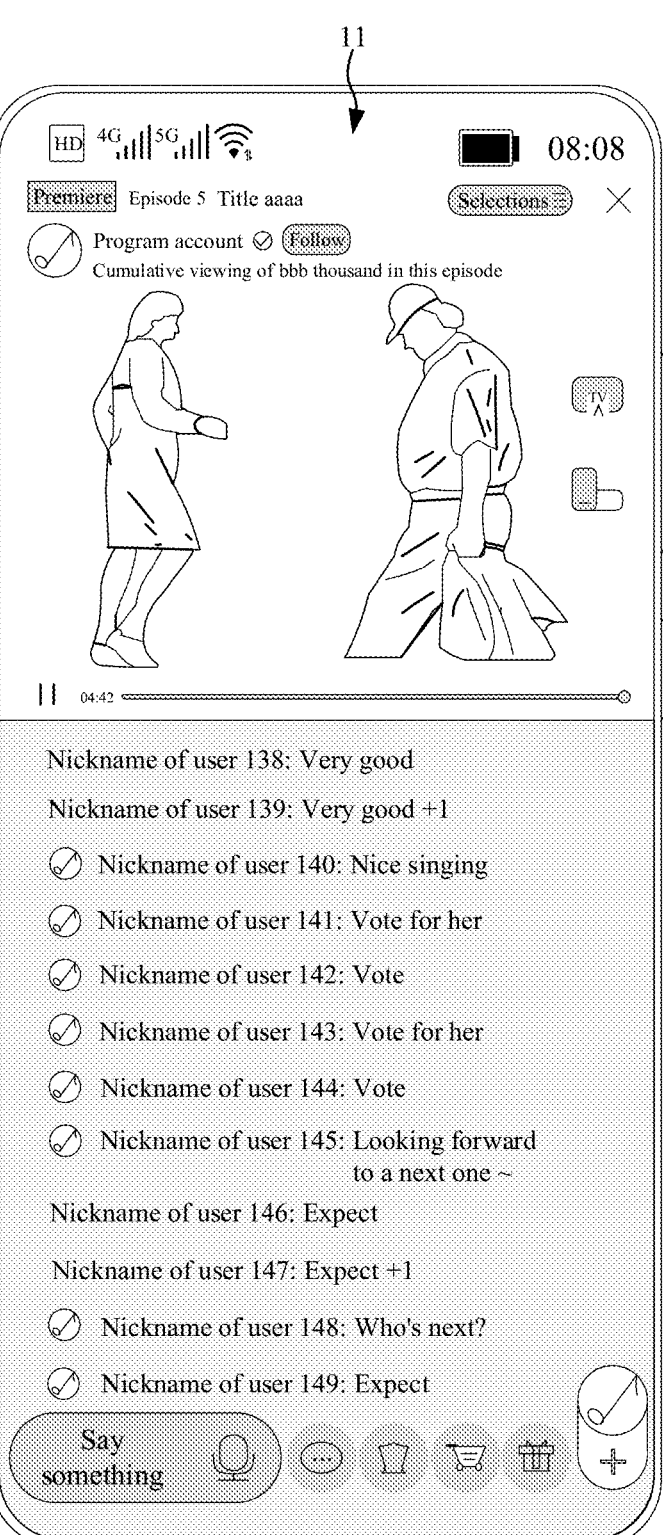
Figure 1J:
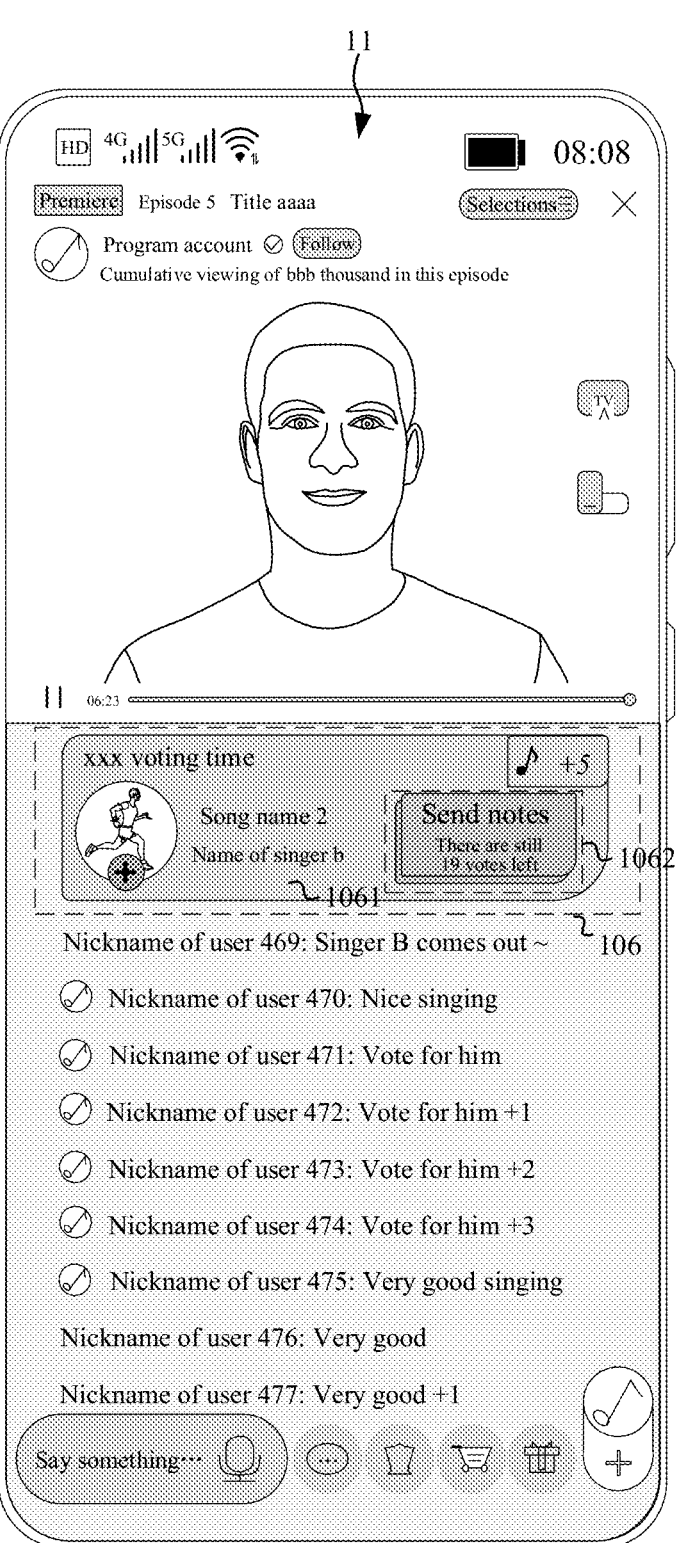
Figure 1K:
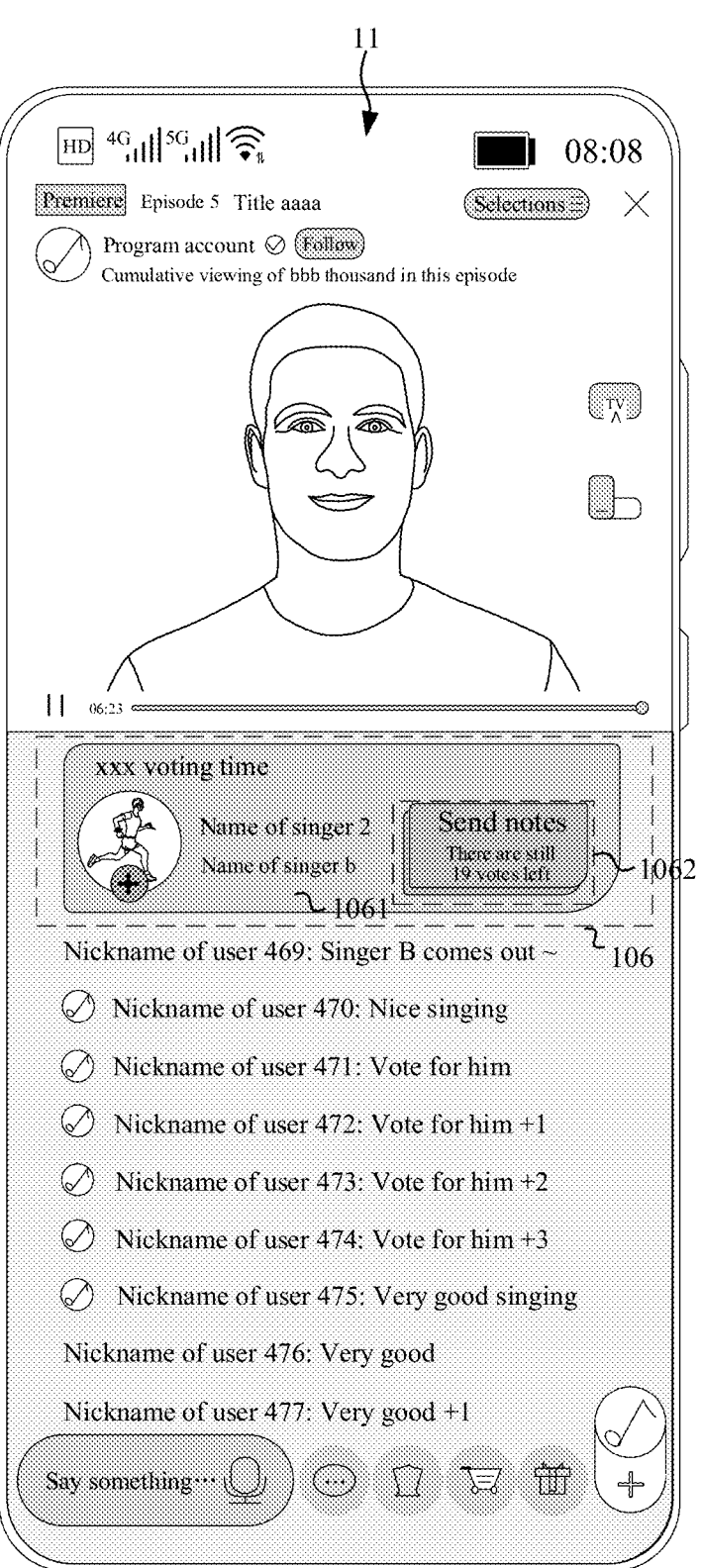
Figure 1L:
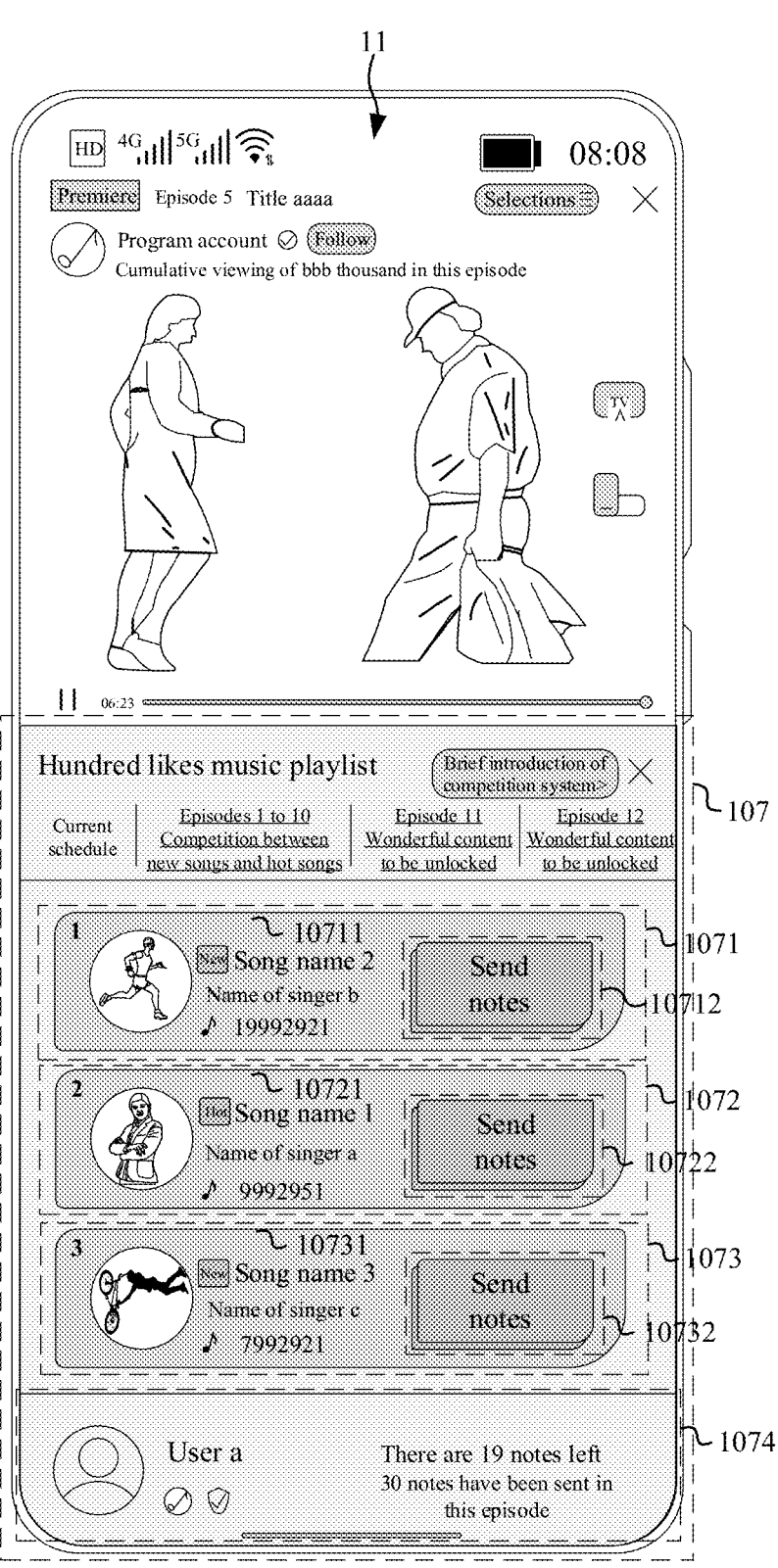
Figure 1M:
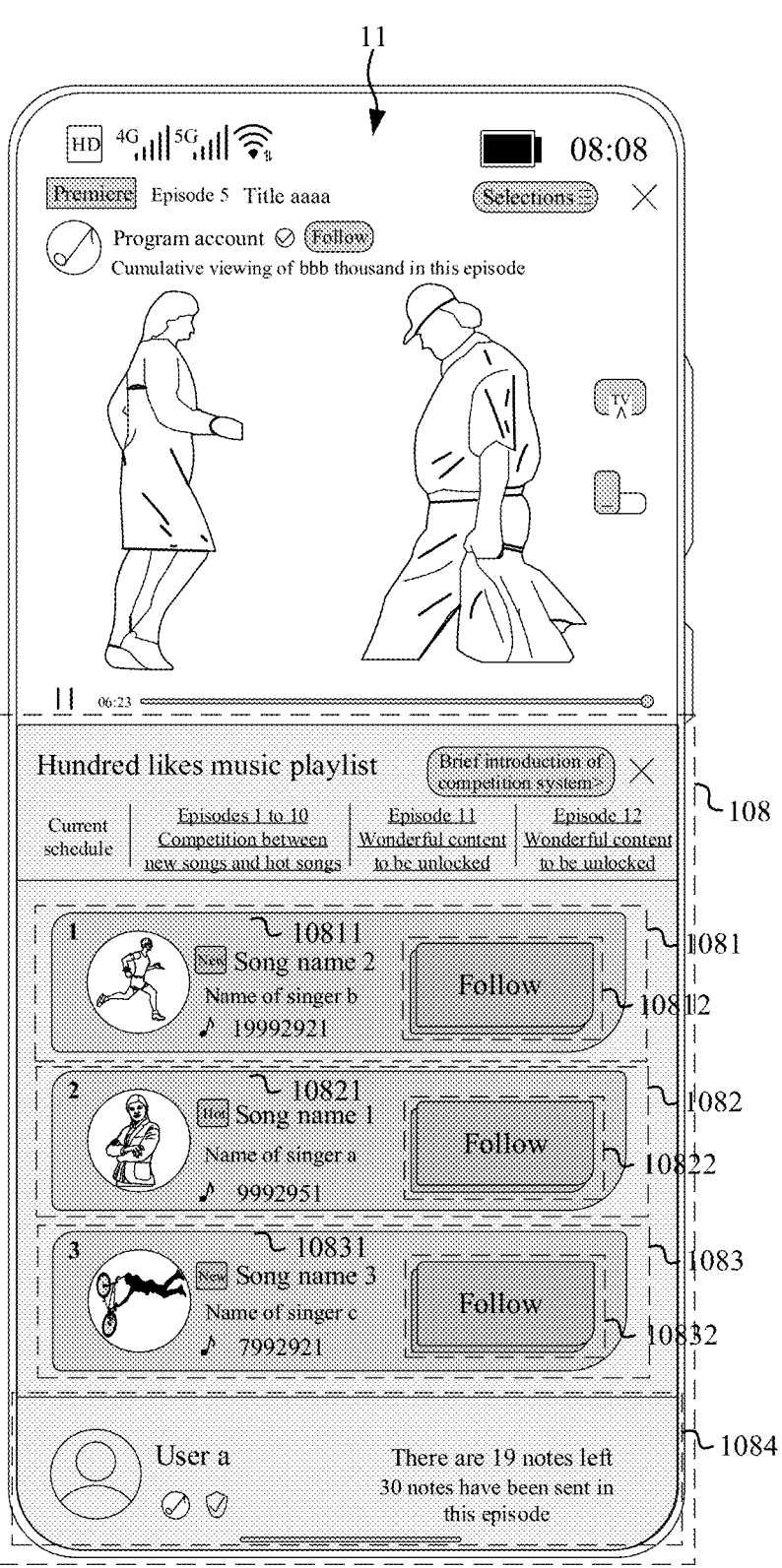
Figure 1N:
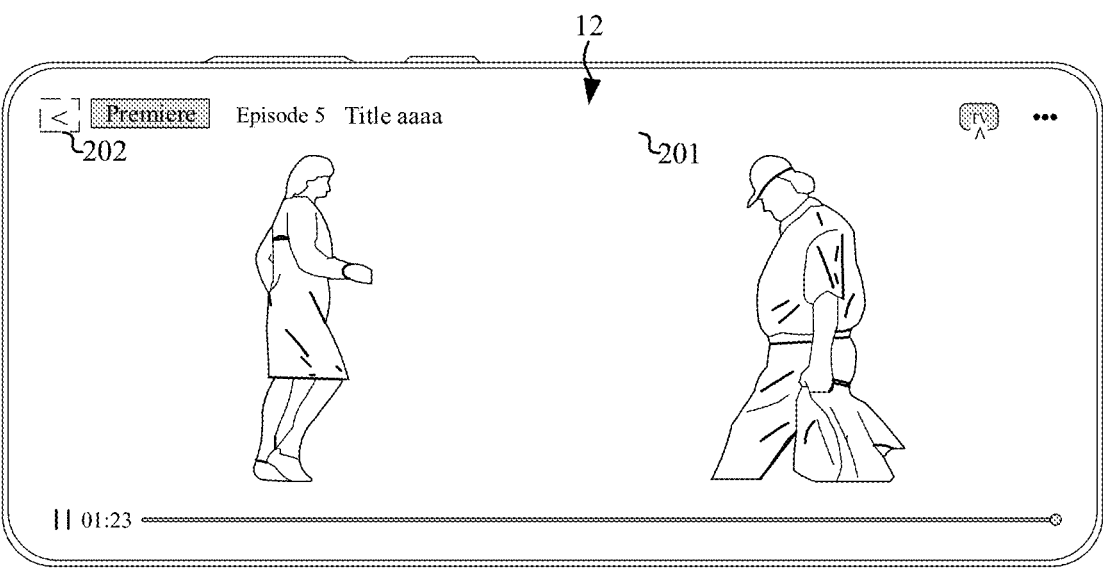
Figure 1O:
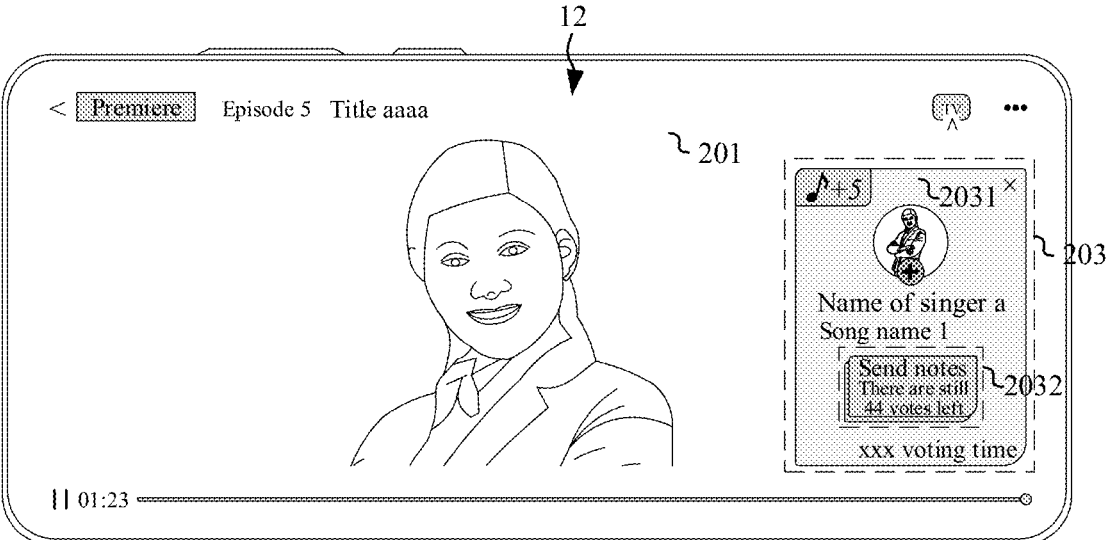
Figure 1P:
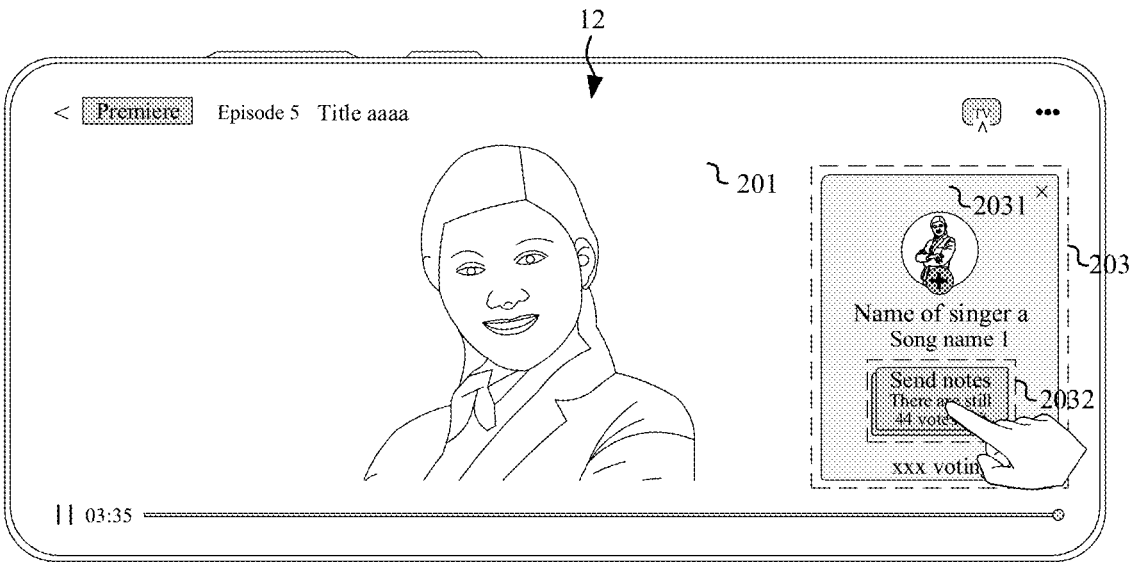
Figure 1Q:
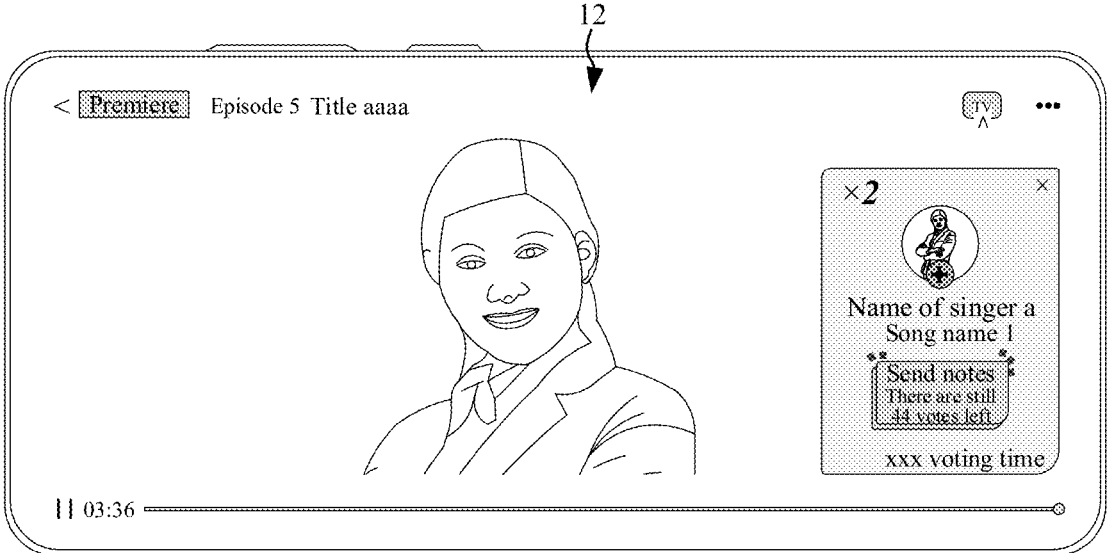
Figure 1R:
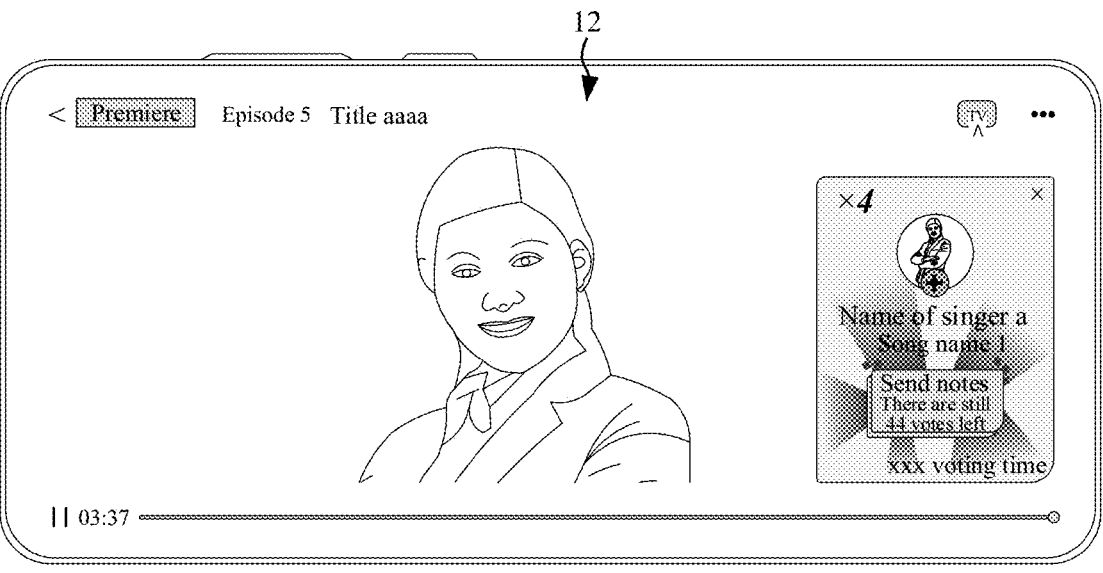
Figure 1S:
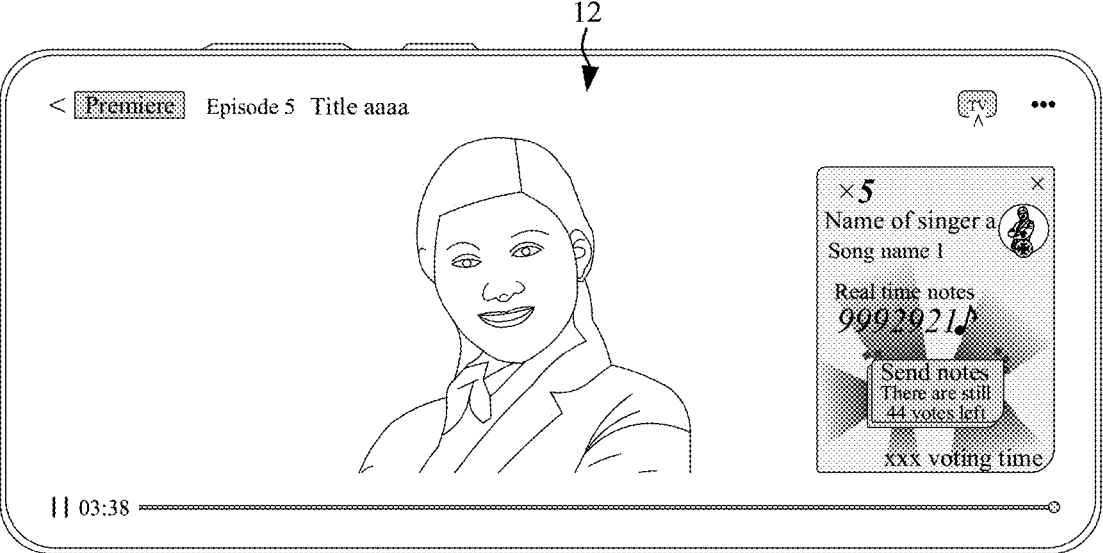
Figure 1T:
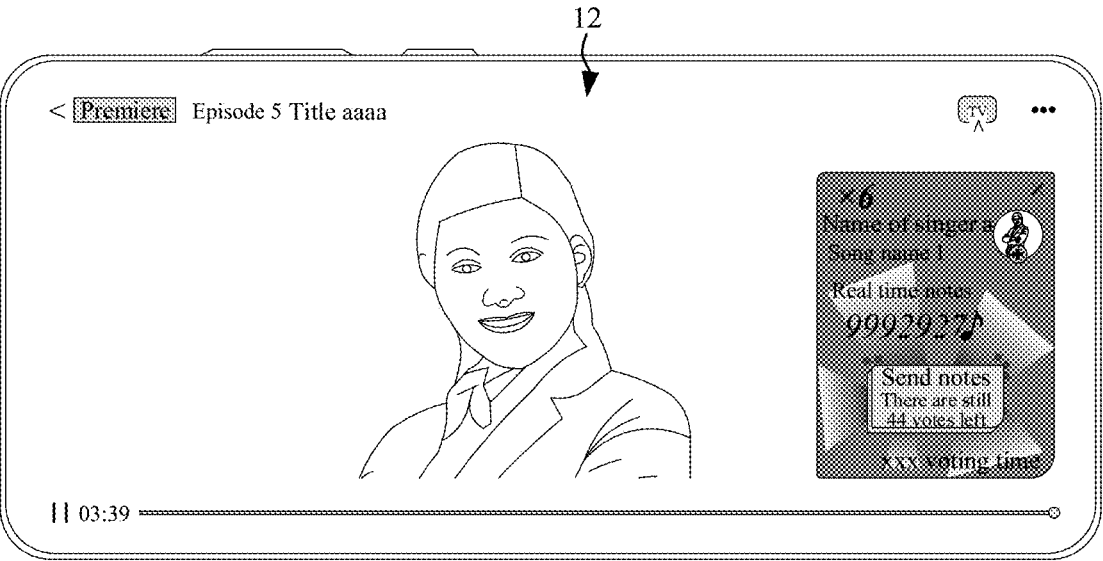
Figure 1U:
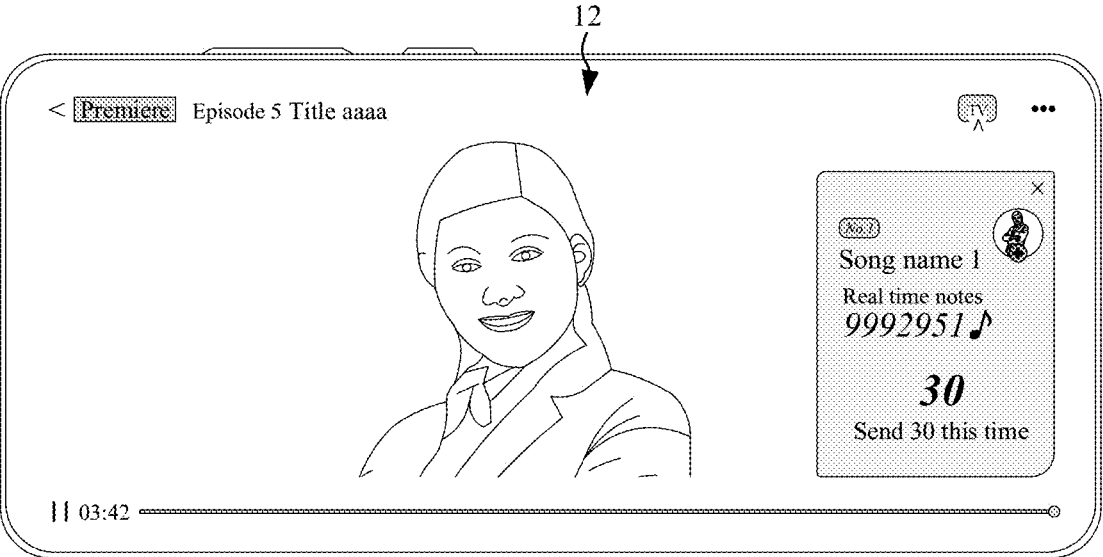

In combination with FIGS. 1A to 1U, a specific implementation process of a support interaction method according to the present disclosure is introduced. For convenience of explanation, in FIGS. 1A to 1U, description is made by an example in which a mobile phone is used as an electronic device, a short video social APP 1 (hereinafter referred to as an application 1) is installed in the mobile phone, a series of video programs may be played in the application 1, a video program is a singer talent show (hereinafter referred to as a program 1), and all objects in the video program include a singer 1, a singer 2 and a singer 3.

Reference is made to FIGS. 1A to 1U, which are schematic diagrams of human-computer interaction interfaces according to embodiments of the present disclosure.

For an application 1, a user interface 11 exemplarily shown in FIG. 1A may be displayed on the mobile phone. The user interface 11 is configured to present the program 1 in a vertical orientation. The user interface 11 may include a display area 101, and the display area 101 is configured to play the program 1, so that a user may watch the program 1. In addition, the display area 101 is further configured to display a program account, the number of views, a viewing progress, a viewing duration and other contents of the program 1, as well as to provide controls related to the program 1, such as a control for adjusting a playing progress of the program 1, a control for putting the program 1 on other electronic devices, a control for closing the playing of the program 1, a control 103 for switching from presenting the program 1 in vertical orientation to presenting the program 1 in horizontal orientation, a control for selecting other programs belonging to a same series as the program 1.

In addition, the user interface 11 may further include a display area 102, and the display area 102 is configured to display comment contents issued by users who have watched the program 1. A way in which the comment contents are displayed in the display area 102 is not limited in the present disclosure. For example, comment contents are displayed in chronological order from the top of the display area 102, and after the number of comment contents exceeds a preset threshold, the earliest comment content may automatically disappear, and a latest comment content may be displayed at the bottom of the display area 102.

Moreover, the display area 102 is further configured to provide controls related to the program 1, such as a control for commenting on the program 1, a control for viewing all comment contents, a control 104 for viewing a leaderboard interface of all singers in the program 1, a control for purchasing support props, a control for following the program account of the program 1 and accessing a page corresponding to the program account of the program 1.

I. Play of Program 1 in Vertical Orientation

With play of the program 1, after a singer 1 appears in the display area 101, the application 1 may display a component 105 exemplarily shown in FIG. 1B in the display area 102, and then display a component 105 exemplarily shown in FIG. 1C in the display area 102. Alternatively, the application 1 may display the component 105 exemplarily shown in FIG. 1C in the display area 102.

The component 105 is configured for the user to support the singer 1 in the playing time period of the singer 1 in the program 1 (support here may be understood as the user sending a support prop "note" to the singer 1).

Parameters such as a position and a style of the component 105 are not limited in the present disclosure.

In some embodiments, as shown in FIG. 1B or 1C, the component 105 includes a display area 1051 and a control 1052. The display area 1051 is configured to display an avatar of the singer 1, a name of the singer 1 and a name of a song performed by the singer 1. The control 1052 is configured for the user to support the singer 1 in the playing time period of the singer 1 in the program 1, and configured to display the remaining number of support props of the user.

In other embodiments, as shown in FIGS. 1F to 1G, the component 105 includes a display area and a control. The display area is configured to display an avatar of the singer 1, a name of the singer 1, a name of a song performed by the singer 1 and a support cumulative result of the singer 1. The control is configured for the user to support the singer 1 in a playing time period of the singer 1 in the program 1, and is configured to display the remaining number of support props of the user.

In addition, the component 105 is located at the top of the display area 102. Moreover, with display of the component 105, comment contents in the display area 102 may be automatically displayed below the component 105.

It should be noted that while the component 105 is displayed, the application 1 may send complimentary support props to the user, which is beneficial to improving the user's interest in supporting. The number of complimentary support props sent from the application 1 to the user may be displayed in the component 105.

For example, in FIG. 1B, the number of complimentary support props sent from the application 1 to the user (indicated by a number "5") is displayed in the component 105. In FIG. 1C, the number of complimentary support props sent from the application 1 to the user (indicated by a number "5") disappears in the component 105.

Upon receiving an operation performed by the user on the component 105 shown in FIG. 1C such as clicking the control 1052, the application 1 may know the user's willing to support the singer 1 and the number of supports devoted by the user to the singer 1. In general, each time the user clicks the control 1052, the user supports the singer 1 once, and the number of supports for the singer 1 is increased by one.

In the application 1, the component 105 may be dynamically displayed based on the number of consecutive clicks performed by the user on the control 1052. In some embodiments, the number of consecutive clicks performed by the user on the control 1052 may be associated with an effect of the component 105. Alternatively, the number of consecutive clicks performed by the user on the control 1052 may be associated with a style of the component 105. Alternatively, the number of consecutive clicks performed by the user on the control 1052 may be associated with both the effect and the style of the component 105.

A specific implementation of the application 1 displaying the component 105 with different special effects based on the number of consecutive clicks performed by the user on the control 1052 is introduced below in combination with FIGS. 1D to 1G.

After the user performs two consecutive clicks on the control 1052, the application 1 may determine that the number of supports devoted by the user to the singer 1 is 2, and then displays the component 105 in effect 1, as exemplarily shown in FIG. 1D. A specific implementation of the effect 1 is not limited in the present disclosure. For example, in FIG. 1D, the effect 1 is an effect that boxes pop out from left and right corners of the component 105 and then gradually disappear.

After the user performs four consecutive clicks on the control 1052, the application 1 may determine that the number of supports devoted by the user to the singer 1 is 4, and then displays the component 105 in effect 2, as exemplarily shown in FIG. 1E.

After the user performs five consecutive clicks on the control 1052, the application 1 may determine that the number of supports devoted by the user to the singer 1 is 5, and then displays the component 105 in effect 2, as exemplarily shown in FIG. 1F.

The effect 2 is different from the effect 1, and a specific implementation of the effect 2 is not limited in the present disclosure. For example, in FIG. 1E and FIG. 1F, the effect 2 is a superposition of an effect that boxes pop out from left and right corners of the component 105 and then gradually disappear and an effect that light explodes from edge of the component 105.

In addition, a style of the component 105 in FIG. 1E is different from a style of the component 105 in FIG. 1F.

After the user performs six consecutive clicks on the control 1052, the application 1 may determine that the number of supports devoted by the user to the singer 1 is 6, and then displays the component 105 in effect 3, as exemplarily shown in FIG. 1G.

The effect 3, the effect 2 and the effect 1 are different, and a specific implementation of the effect 3 is not limited in the present disclosure. For example, in FIG. 1G, the effect 3 is a superposition of an effect that boxes pop out from left and right corners of the component 105 and then gradually disappear, an effect that light explodes from edge of the component 105, and an effect of deepening a color of the component 105.

After the user no longer clicks the control 1052, the application 1 may display, on the component 105, the number of supports devoted by the user to the singer 1, as exemplarily shown in FIG. 1H, which is beneficial for the user to know the number of supports devoted to the singer 1 in time, thus providing close participation of the user in the video program.

The number of supports devoted by the user to the singer 1 is displayed on the component 105 at a position of the control 1052. In addition, for the application 1, a support cumulative result and a ranking of the singer 1 may be displayed on the component 105, as exemplarily shown in FIG. 1H. This is beneficial for the user to get comprehensive information about the supports to the singer 1.

As the playing of program 1 continues, after the singer 1 no longer appears in the display area 101, the application 1 no longer displays the component 105 in the display area 102, and a user interface 11 exemplarily shown in FIG. 1I may be displayed on the mobile phone.

As the playing of program 1 continues, after a singer 2 appears in the display area 101, the application 1 may display a component 106 exemplarily shown in FIG. 1J in the display area 102, and then display a component 106 exemplarily shown in FIG. 1K in the display area 102. Alternatively, the application 1 may display the component 106 exemplarily shown in FIG. 1K in the display area 102.

The component 106 is configured for the user to support the singer 2 in a playing time period of the singer 2 in the program 1 (support here may be understood as the user sending a support prop "note" to the singer 2).

For a specific implementation of the component 106, reference may be made to the description of the component 105 in FIG. 1B or FIG. 1C, which is not repeated here.

It should be noted that while the component 106 is displayed, the application 1 may send complimentary support props to the user, which is beneficial to improving the user's interest in supporting. The number of complimentary support props sent from the application 1 to the user may be displayed in the component 106.

For example, in FIG. 1J, the number of complimentary support props sent from the application 1 to the user (indicated by a number "5") is displayed in the component 106. In FIG. 1K, the number of complimentary support props sent from the application 1 to the user (indicated by a number "5") disappears in the component 106.

Upon receiving an operation performed by the user on component 106 shown in FIG. 1K such as clicking the control 1062, the application 1 may know the user's willing to support the singer 2 and the number of supports devoted by the user to the singer 2. In general, each time the user clicks the control 1062, the user supports the singer 2 once, and the number of supports for the singer 2 is increased by one.

In the application 1, the component 106 may be dynamically displayed based on the number of consecutive clicks performed by the user on the control 1062. In addition, for a specific implementation of displaying the component 106, reference may be made to the description of displaying the component 105 in FIGS. 1D to 1H, which is not repeated here.

As the playing of program 1 continues, after the singer 2 no longer appears in the display area 101, the application 1 no longer displays the component 106 in the display area 102, and the user interface 11 exemplarily shown in FIG. 1I may be displayed on the mobile phone.

After a singer 3 appears in the display area 101, the application 1 may display a component corresponding to the singer 3 in the display area 102, in the manner of displaying the component 105 or the component 106, so that the user may support the singer 3 in a playing time period of the singer 3 in the program 1 through an operation on the component corresponding to the singer 3, until the singer 3 no longer appears in the display area 101. The application 1 may continue playing program 1 till the end of the program 1.

II. Display of Leaderboard

Upon receiving an operation performed by the user in the display area 102 such as clicking the control 104, the application 1 may determine whether a support time period of the program 1 has ended. The support time period may be understood as an effective period for the user to support the singers in the program 1.

On one hand, if it is determined that the support time period of the program 1 has not ended, the application 1 may switch, from displaying the display area 102 to displaying a display area 107.

The display area 107 is configured to display a leaderboard interface of all singers who have appeared in the played segment of the program 1. All singers who have appeared in the played segment of the program 1 here may be understood as follows: in a case of a premiere of the program 1, all singers who have appeared in the display area 101 are referred to as all singers who have appeared in the played segment of the program 1; and in a case of a non-premiere of the program 1, all singers in the program 1 are referred to as all singers who have appeared in the played segment of the program 1.

For example, upon receiving an operation performed by the user in the display area 102 as shown in FIGS. 1C to 1I such as clicking the control 104, the application 1 may display a leaderboard of the singer 1 in the display area 107.

For another example, upon receiving an operation performed by the user in the display area 102 as shown in FIG. 1K such as clicking the control 104, the application 1 may display leaderboard of the singer 1 and the singer 2 in the display area 107.

For another example, after the appearance of the singer 1, the singer 2 and the singer 3 in the display area 101, upon receiving an operation performed by the user in the display area 102 such as clicking the control 104, the application 1 may display leaderboard of the singer 1, the singer 2 and the singer 3 in the display area 107 as shown in FIG. 1L.

In addition, the display area 107 is also configured for the user to continue to support the singers in the leaderboard interface. A specific implementation of the display area 107 is not limited in the present disclosure.

In some embodiments, based on rankings, the display area 107 includes a component 1071, a component 1072, a component 1073 and a display area 1074 from top to bottom.

The component 1071 is configured for the user to continue to support the singer 2, and configured to display a support cumulative result and a ranking of the singer 2 or other contents. In FIG. 1L, the component 1071 may include a display area 10711 and a control 10712. The display area 10711 is configured to display an avatar of the singer 2, a new song logo, a name of a song performed by the singer 2, a name of the singer 2, a support cumulative result of the singer 2 and a ranking of the singer 2. The control 10712 is configured for the user to continue to support the singer 2.

The component 1072 is configured for the user to continue to support the singer 1, and to display a support cumulative result and a ranking of the singer 1 and other contents. In FIG. 1L, the component 1072 may include a display area 10721 and a control 10722. The display area 10721 is configured to display an avatar of the singer 1, a hot song logo, a name of a song performed by the singer 1, a name of the singer 1, a support cumulative result of the singer 1 and a ranking of the singer 1. The control 10722 is configured for the user to continue to support the singer 1.

The component 1073 is configured for the user to continue to support the singer 3, and to display a support cumulative result and a ranking of the singer 3 and other contents. In FIG. 1L, the component 1073 may include a display area 10731 and a control 10732. The display area 10731 is configured to display an avatar of the singer 3, a new song logo, a name of a song performed by the singer 3, a name of the singer 3, a support cumulative result of the singer 3 and a ranking of the singer 3. The control 10732 is configured for the user to continue to support the singer 3.

The display area 1074 is configured to display an avatar of the user, a name of the user, the remaining number of supports of the user, i.e., the remaining number of support props.

In the application 1, upon receiving an operation performed by the user on the component 1072 such as clicking the control 10722, "+N" may be displayed in the display area 10721 to indicate the number N of supports devoted by the user to the singer 1, and the support cumulative result of the singer 1 may be changed in the display area 10721.

Moreover, the application 1 may determine whether the ranking of the singer 1 has changed based on the support cumulative result of the singer 1. Therefore, after the support cumulative result of the singer 1 is greater than that of the singer 2, the application 1 displays the component 1072, the component 1071 and the component 1073 sequentially in the display area 107 from top to bottom.

On the other hand, if it is determined that the support time period for the program 1 has ended, the application 1 may switch from displaying the display area 102 to displaying a display area 108 as shown in FIG. 1M.

The display area 108 is configured to display a leaderboard interface of all singers who have appeared in the played segment of the program 1. For all singers who have appeared in the played segment of the program 1, reference may be made to the above description, which is not repeated here.

The display area 108 is further configured for the user to associate with social accounts of all singers in the application 1. A specific implementation of the display area 108 is not limited in the present disclosure.

In some embodiments, based on rankings, the display area 108 includes a component 1081, a component 1082, a component 1083 and a display area 1084 from top to bottom.

The component 1081 is configured for the user to associate with a social account of the singer 2 in the application 1, and configured to display a support cumulative result and a ranking of the singer 2 or other contents. In FIG. 1M, the component 1081 may include a display area 10811 and a control 10812. The display area 10811 is configured to display an avatar of the singer 2, a new song logo, a name of a song performed by the singer 2, a name of the singer 2, a support cumulative result of the singer 2 and a ranking of the singer 2. The control 10812 is configured for the user to associate with a social account of the singer 2 in the application 1.

The component 1082 is configured for the user to associate with a social account of the singer 1 in the application 1, and configured to display a support cumulative result and a ranking of the singer 1 or other contents. In FIG. 1M, the component 1082 may include a display area 10821 and a control 10822. The display area 10821 is configured to display an avatar of the singer 1, a hot song logo, a name of a song performed by the singer 1, a name of the singer 1, a support cumulative result of the singer 1 and a ranking of the singer 1. The control 10822 is configured for the user to associate with a social account of the singer 1 in the application 1.

The component 1083 is configured for the user to associate with a social account of the singer 3 in the application 1, and configured to display a support cumulative result and a ranking of the singer 3 or other contents. In FIG. 1M, the component 1083 may include a display area 10831 and a control 10832. The display area 10831 is configured to display an avatar of the singer 3, a new song logo, a name of a song performed by the singer 3, a name of the singer 3, a support cumulative result of the singer 3 and a ranking of the singer 3. The control 10832 is configured for the user to associate with a social account of the singer 3 in the application 1.

The display area 1084 is configured to display an avatar of the user, a name of the user, the remaining number of supports of the user, i.e., the remaining number of support props.

Upon receiving an operation performed by the user on the component 1082 such as clicking the control 10822, the application 1 may implement association with the social account of the singer 1 in the application 1, such as displaying a page corresponding to the social account of the singer 1 in the application 1.

III. Play of Program 1 on Horizontal Orientation

During play of the program 1, upon receiving an operation performed by the user in the display area 101 as shown in FIG. 1A such as clicking the control 103, the application 1 may display a user interface 12 exemplarily shown in FIG. 1N. The user interface 12 is configured to present the program 1 in a horizontal orientation.

The user interface 12 may include a display area 201, and the display area 201 is configured to play the program 1 in full screen, so that the user may watch the program 1. In addition, the display area 201 is further configured to display a viewing progress, a viewing duration and other contents of the program 1, as well as to provide controls related to the program 1, such as a control for adjusting a playing progress of the program 1, a control for putting the program 1 on other electronic devices, a control for closing the playing of the program 1, a control 202 for switching from presenting the program 1 in horizontal orientation to presenting the program 1 in vertical orientation, a control for selecting other programs belonging to a same series as the program 1.

With play of the program 1, after a singer 1 appears in the display area 201, the application 1 may display a component 203 exemplarily shown in FIG. 1O in the display area 201, and then display a component 203 exemplarily shown in FIG. 1P in the display area 201. Alternatively, the application 1 may display the component 203 exemplarily shown in FIG. 1P in the display area 201.

The component 203 is configured for the user to support the singer 1 in the playing time period of the singer 1 in the program 1 (support here may be understood as the user sending a support prop "note" to the singer 1).

Parameters such as a position and a style of the component 203 are not limited in the present disclosure.

In some embodiments, as shown in FIG. 1O or 1P, the component 203 includes a display area 2031 and a control 2032. The display area 2031 is configured to display an avatar of the singer 1, a name of the singer 1 and a name of a song performed by the singer 1. The control 2032 is configured for the user to support the singer 1 in the playing time period of the singer 1 in the program 1, and configured to display the remaining number of support props of the user.

In other embodiments, as shown in FIGS. 1S to 1T, the component 203 includes a display area and a control. The display area is configured to display an avatar of the singer 1, a name of the singer 1, a name of a song performed by the singer 1 and a support cumulative result of the singer 1. The control is configured for the user to support the singer 1 in a playing time period of the singer 1 in the program 1, and configured to display the remaining number of supports of the user.

In addition, the component 203 covers part of the display area 201, and a specific position of the component 203 is not limited in the present disclosure.

It should be noted that while the component 203 is displayed, the application 1 may send complimentary support props to the user, which is beneficial to improving the user's interest in supporting. The number of complimentary support props sent from the application 1 to the user may be displayed in the component 203.

For example, in FIG. 1O, the number of complimentary support props sent from the application 1 to the user (indicated by a number "5") is displayed in the component 203. In FIG. 1P, the number of complimentary support props sent from the application 1 to the user (indicated by a number "5") disappears in the component 203.

Upon receiving an operation performed by the user on the component 203 shown in FIG. 1P such as clicking the control 2032, the application 1 may know the user's willing to support the singer 1 and the number of supports devoted by the user to the singer 1. In general, each time that the user clicks the control 2032, the user supports the singer 1 once, and the number of supports for the singer 1 is increased by one.

For the application 1, the component 203 may be dynamically displayed based on the number of consecutive clicks performed by the user on the control 2032. In some embodiments, the number of consecutive clicks performed by the user on the control 2032 may be associated with an effect of the component 203. Alternatively, the number of consecutive clicks performed by the user on the control 2032 may be associated with a style of the component 203. Alternatively, the number of consecutive clicks performed by the user on the control 2032 may be associated with both the effect and the style of the component 203.

A specific implementation process of the application 1 displaying the component 203 with different special effects based on the number of consecutive clicks performed by the user on the control 2032 is introduced below in combination with FIGS. 1Q to 1T.

After the user performs two consecutive clicks on the control 2032, the application 1 may determine that the number of supports devoted by the user to the singer 1 is 2, and then displays a component 203 in effect 1, as exemplarily shown in FIG. 1Q. For a specific implementation of the effect 1, reference may be made to the above description, which is not repeated here.

After the user performs four consecutive clicks on the control 2032, the application 1 may determine that the number of supports devoted by the user to the singer 1 is 4, and then displays a component 203 in effect 2, as exemplarily shown in FIG. 1R.

After the user performs five consecutive clicks on the control 2032, the application 1 may determine that the number of supports devoted by the user to the singer 1 is 5, and then displays a component 203 in the effect 2, as exemplarily shown in FIG. 1S.

For a specific implementation of the effect 2, reference may be made to the above description, which is not repeated here.

In addition, a style of the component 203 in FIG. 1R is different from a style of the component 203 in FIG. 1S.

After the user performs six consecutive clicks on the control 2032, the application 1 may determine that the number of supports devoted by the user to the singer 1 is 6, and then displays the component 203 in effect 3, as exemplarily shown in FIG. 1T.

For a specific implementation of the effect 3, reference may be made to the above description, which is not repeated here.

After the user no longer clicks the control 2032, the application 1 may display, on the component 203, the number of supports devoted by the user to the singer 1, as exemplarily shown in FIG. 1U, which is beneficial for the user to know the number of supports devoted to the singer 1 in time, thus providing a close participation of the user in the video program.

The number of supports devoted by the user to the singer 1 is displayed on the component 203 at a position of the control 2032. In addition, for the application 1, a support cumulative result and a ranking of the singer 1 may be displayed on the component 203, as exemplarily shown in FIG. 1U. This is beneficial for the user to get comprehensive information about the supports to the singer 1.

As the playing of program 1 continues, after the singer 1 no longer appears in the display area 201, the application 1 no longer displays the component 203 in the display area 201, and the user interface 12 exemplarily shown in FIG. 1N may be displayed on the mobile phone.

After a new singer (such as a singer 2 or a singer 3) appears in the display area 201, the application 1 may display a component corresponding to the new singer in the display area 201 in a same display mode as the component 203, so that the user may support the new singer in a playing time period of the new singer in the program 1 through an operation on the component corresponding to the singer, until no new singer appears in the display area 201. The application 1 may continue playing program 1 till the end of the program 1.

To sum up, with the play of the program 1, whenever a new singer appears in the display area of the program 1, the application 1 may display a component while playing the program 1, and the component may be used as an entry for the user to support the singer in the playing time period of the singer in the program 1. Therefore, through operation(s) on the component, the user may implement online support to the singer in real time, and the number of supports devoted by the user to the singer may also be displayed in real time, which provides a close participation of the user in a video program. In addition, a support cumulative result and a ranking of the singer may also be displayed, so that the user may get comprehensive information about the supports to the singer, which is convenient for the user to devote additional supports to the singer. In addition, based on the number of consecutive operations performed by the user on the component, the component may be displayed in different special effects, to enrich the interface for devoting supports shown to the user and make the operations of the user for devoting supports more stereoscopic.

Based on the description of the embodiments in FIGS. 1A to 1U and in combination with FIG. 2, a specific implementation process of a support interaction method according to the present disclosure is described in detail.

Reference may be made to FIG. 2, which is a schematic flowchart of a support interaction method according to an embodiment of the present disclosure. As shown in FIG. 2, the support interaction method according to the present disclosure may include the following steps S101 to S104.

In S101, a playing interface of a video program in an application is displayed.

After starting the application, an electronic device may display the playing interface of the video program in the application. Parameters such as a type of the application, a type and a content of the video program, as well as a display mode, a display area and a display position of the playing interface are not limited in the present disclosure.

In some embodiments, assuming that a first application is the application 1 in FIGS. 1A to 1U and the video program is the program 1 in FIGS. 1A to 1U, if the electronic device displays the playing interface in vertical orientation, for a specific implementation of step S101, reference may be made to the description of FIGS. 1A to 1J, and for a specific implementation of the playing interface, reference may be made to the description of the user interface 11 in FIGS. 1A to 1J, which is not repeated here.

In other embodiments, assuming that that a first application is the application 1 in FIGS. 1A to 1U and the video program is the program 1 in FIGS. 1A to 1U, if the electronic device displays the playing interface in horizontal orientation, for a specific implementation of step S101, reference may be made to the description of FIGS. 1N to 1U, and for a specific implementation of the playing interface, reference may be made to the description of the user interface 12 in FIGS. 1N to 1U, which is not repeated here.

In S102, in response to a first object in the video program appearing in the playing interface, a first component is displayed.

With play of the video program, after a first object in the video program appears in the playing interface, the electronic device may determine whether a current moment is within a support time period of the video program. If it is determined that the current moment is within the support time period of the video program, the electronic device may display the playing interface and a first component. If it is determined that the current moment is not within the support time period of the video program, the electronic device may continue to display the playing interface without displaying the first component.

The first object is an object in the video program. For example, in a case that the video program is a singer talent show, the first object may be a singer or a group of singers. In a case that the video program is a talk show, the first object may be a talk show actor or a group of talk show actors. In a case that the video program is an idol talent show, the first object may be an idol in the show, or the first object may be a tutor of the show. In a case that the video program is a TV series, the first object may be an actor.

The first component is configured to devote support to the first object in a first time period, and the first time period is a time period in which appearance of the first object in the video program is played in the playing interface.

Parameters such as size, position, style and effect of the first component are not limited in the present disclosure. For example, the first component may be displayed in a style of a word, a letter, a number, an icon, a picture or the like.

In some embodiments, in a case that the first object is a singer 1, for a specific implementation of step S102, reference may be made to the description of FIG. 1B or FIG. 1C; and for the first component, reference may be made to the description of the component 105 in FIG. 1B or FIG. 1C. The first time period is a time period in which the singer 1 is played in the display area 101 as shown in FIG. 1B or FIG. 1C, which is not repeated here.

In other embodiments, in a case that the first object is a singer 2, for a specific implementation of step S102, reference may be made to the description of FIG. 1J or FIG. 1K; and for the first component, reference may be made to the description of the component 106 in FIG. 1J or FIG. 1K. The first time period is a time period in which the singer 2 is played in the display area 101 as shown in FIG. 1J or FIG. 1K, which is not repeated here.

In other embodiments, in a case that the first object is a singer 1, for a specific implementation of step S102, reference may be made to the description of FIG. 1O or FIG. 1P, and for the first component, reference may be made to the description of the component 203 in FIG. 1O or FIG. 1P. The first time period is a time period in which the singer 1 is played in the display area 201 as shown in FIG. 1O or FIG. 1P, which is not repeated here.

In S103, a first operation performed by a user on the first component is received in the first time period.

In S104, in response to receiving the first operation, the number of supports devoted by the user to the first object is displayed in the first component.

In the first time period, the electronic device may receive a first operation performed by a user on the first component. The first operation may include but not limited to clicking, double clicking, long pressing, sliding and other types of operations. For example, the first operation may be a click operation performed by the user on the control 1052 as shown in FIG. 1C. Alternatively, the first operation may be a click operation performed by the user on the control 1062 as shown in FIG. 1K. Alternatively, the first operation may be a click operation performed by the user on the control 2032 as shown in FIG. 1P.

Upon receiving the first operation, the electronic device may display the number of supports devoted by the user to the first object. This is beneficial for the user to know supports devoted from the user to the first object in time and improves a close participation of the user in the video program. The number of supports may be understood as the number of votes, such as the number of support props sent by the user to the first object.

In some embodiments, in a case that the first operation is a click operation performed by the user on the control 1052 in FIG. 1C, for a specific implementation of step S104, reference may be made to the description of FIG. 1H, which is not repeated here.

In other embodiments, in a case that the first operation is a click operation performed by the user on the control 2032 in FIG. 1P, for a specific implementation of step S104, reference may be made to the description of FIG. 1U, which is not repeated here.

In a support interaction method according to the present disclosure, a playing interface of a video program in an application may be displayed through an electronic device, to play the video program to a user. In response to a first object in the video program appearing in the playing interface, the electronic device may display a first component, where the first component may be used as an entry for supporting the first object in a first time period, and the first time period is a time period in which appearance of the first object in the video program is played in the playing interface. The electronic device may receive a first operation performed by the user on the first component. Upon receiving the first operation, the electronic device may display, in the first component, the number of supports devoted by the user to the first object. Therefore, while playing the video program, an online support of the user for the first object may be accomplished, so that the user may to achieve a close interaction in the video program, which improves the timeliness of the interaction when the user watches the video program.

In step S104, upon receiving the first operation, in addition to displaying the number of supports devoted by the user to the first object, the electronic device may further display a support cumulative result and a ranking of the first object in the first component, which is beneficial for the user to comprehensively acquire support situation of the first object.

In some embodiments, for a specific implementation of the above process, reference may be made to the description of the content displayed by the component 105 in FIG. 1H or the component 203 in FIG. 1U, which is not repeated here.

In step S103, the user may consecutively perform one or more operations on the first component. In step S104, upon receiving the first operation, the electronic device may determine whether the number of the first operations consecutively performed by the user on the first component is within a preset range. In a case that the number of the first operations consecutively performed by the user on the first component is within the preset range, the first component is displayed in an effect corresponding to the preset range. Therefore, the display special effect of the first component is enriched, and an effect brought by a support operation is timely fed back to the user.

In some embodiments, in a case that the number of the first operations consecutively performed by the user on the first component in within a preset range of being equal to 2, for a specific implementation process of the above step, reference may be made to the description of FIG. 1D or FIG. 1Q, which is not repeated here.

In other embodiments, in a case that the number of the first operations consecutively performed by the user on the first component in within a preset range of being equal to 4 or 5, for a specific implementation process of the above step, reference may be made to the description of FIG. 1E, 1F, 1R or 1S, which is not repeated here.

In other embodiments, in a case that the number of the first operations consecutively performed by the user on the first component in within a preset range equal to of being 6, for a specific implementation process of the above step, reference may be made to the description of FIG. 1G or FIG. 1T, which is not repeated here.

Based on the foregoing description, the electronic device may further display a first control. The first control may be displayed together with the playing interface. Parameters such as a shape, a size, a position and a color of the first control are not limited in the present disclosure.

The electronic device may receive a second operation performed by the user on the first control. The second operation may include but not limited to clicking, double clicking, long pressing, sliding and other types of operations. For example, the second operation may be a click operation performed by the user on the control 104 as shown in FIGS. 1A to 1K.

Upon receiving the second operation, the electronic device may display a leaderboard interface. The leaderboard interface may include support cumulative results and rankings of all objects who have appeared in the played segment of the video program. Therefore, it is beneficial for the user to get comprehensive information about support situation of all objects in the video interface.

Parameters such as a content, a position and a size of the leaderboard interface are not limited in the present disclosure. For example, for a specific implementation of the leaderboard interface, reference may be made to the description of the display area 107 in FIG. 1L or the display area 108 in FIG. 1M, which is not repeated here.

In the present disclosure, the electronic device may determine whether a second time period has ended, to choose to display different leaderboard interfaces. The second time period is a support time period of the video program.

In some embodiments, in a case that it is determined that the second time period has not ended, the electronic device may display a second control on the leaderboard interface, and the second control is configured to devote support to the first object in the second time period.

Parameters such as a size, a position and a color of the second control are not limited in the present disclosure. For example, for a specific implementation of the second control, reference may be made to the description of the control 10712, the control 10722 or the control 10732 in FIG. 1L, which is not repeated here.

It should be noted that the electronic device may display controls corresponding to objects other than the first object on the leaderboard interface, to allow the user to support other objects by operating on the controls.

Moreover, in addition to the controls, the electronic device may further display related information of each object on the leaderboard interface, as shown in the description of the display area 10711, the display area 10721 or the display area 10731 in FIG. 1L, which are not repeated here.

In the second time period, the electronic device may receive a third operation performed by the user on the second control. The third operation may include but not limited to clicking, double clicking, long pressing, sliding and other types of operations. For example, the third operation may be a click operation performed by the user on the control 10722 as shown in FIG. 1L.

Upon receiving the third operation, the electronic device may update the support cumulative result and the ranking of the first object in the leaderboard interface. For a specific implementation process of the above step, reference may be made to the description of FIG. 1L, which is not repeated here.

To sum up, the user is enabled to devote additional number of supports to the first object through the display of the second control by the electronic device.

In other embodiments, in a case that it is determined that the second time period has ended, the electronic device may display a third control on the leaderboard interface, and the third control is configured to associate with a social account of the first object beyond the second time period.

Parameters such as a size, a position and a color of the third control are not limited in the present disclosure. For example, for a specific implementation of the third control, reference may be made to the description of the control 10812, the control 10822 or the control 10832 in FIG. 1M, which is not repeated here.

It should be noted that the electronic device may controls corresponding to objects other than the first object on the leaderboard interface, to allow the user to associate with social accounts of other objects in the application by operating on the controls.

Moreover, in addition to the controls, the electronic device may further display related information of each object on the leaderboard interface, as shown in the description of the display area 10811, the display area 10821 or the display area 10831 in FIG. 1M, which is not repeated here.

Beyond the second time period, the electronic device may receive a fourth operation performed by the user on the third control. The fourth operation may include but not limited to clicking, double clicking, long pressing, sliding and other types of operations. For example, the fourth operation may be a click operation performed by the user on the control 10822 as shown in FIG. 1M.

Upon receiving the fourth operation, the electronic device may implement association with the social account of the first object in the application. In some embodiments, for a specific implementation process of the above step, reference may be made to FIG. 1M, which is not repeated here.

To sum up, the user is enabled to associate with the social account of the first object in the application through the display of the third control by the electronic device.

In step S102, the electronic device may display the first component in various ways.

In some embodiments, in a case that the electronic device displays the playing interface in vertical orientation, the electronic device may display the playing interface in a first area and display the first component in a second area, where the first area and the second area do not overlap with each other. Therefore, the user is enabled to watch the video program in vertical orientation, which provides an option of playing the video program.

Based on the foregoing description, in addition to displaying the first component in the second area, the electronic device may further display, in the second area, comment contents comment content watched the video program. Therefore, while watching the video program, the user may not only see comment contents of other users regarding to the video program, but also publish his/her own comment content regarding to the video program in time.

For a specific implementation process of the above step, reference may be made to the description of FIG. 1B to FIG. 1C or FIG. 1J to FIG. 1K, which is not repeated here.

In other embodiments, in a case that the electronic device displays the playing interface in vertical orientation, the electronic device may display the playing interface in full screen and display the first component on the playing interface. Therefore, the user may watch the video program in full screen, and the viewability of the video program is improved.

The first component covers part of the playing interface, and parameters such as a position and an area of the first component on the playing interface are not limited in the present disclosure. For a specific implementation process of the above step, reference may be made to the description of FIG. 1O to FIG. 1P, which is not repeated here.

In step S102, the first component may be in various styles.

In some embodiments, the first component may include a third area and a fourth control. The third area is configured to display an avatar of the first object, a name of the first object and a name of a performance content of the first object. The fourth control is configured to devote support to the first object in the first time period and display the remaining number of supports of the user.

For example, in a case that the first component is the component 105 in FIGS. 1B to 1E, the third area is the display area 1051, and the fourth control is the control 1052.

For another example, in a case that the first component is the component 106 in FIGS. 1J to 1K, the third area is the display area 1061, and the fourth control is the control 1062.

For another example, in a case that the first component is the component 203 in FIGS. 1N to 1R, the third area is the display area 2031, and the fourth control is the control 2032.

In other embodiments, the first component may include a fourth area and a fifth control. The fourth area is configured to display an avatar of the first object, a name of the first object, a name of a performance content of the first object and a support cumulative result of the first object. The fifth control is configured to devote support to the first object in the first time period and display the remaining number of supports of the user.

For example, in a case that the first component is the component 105 in FIGS. 1F to 1G, the third area is the display area 1051, and the fourth control is the control 1052.

For another example, in a case that the first component is the component 203 in FIGS. 1S to 1T, the third area is the display area 2031, and the fourth control is the control 2032.

To sum up, after a user performs an operation on a first component, a style and/or an effect of the first component may be dynamically changed, so that a support operation of the user may be fed back to the user in time, thus improving a close participation of the user in a video program.

Exemplarily, an electronic device is provided according to the present disclosure. The electronic device includes: one or more processors; a memory; and one or more computer programs, where the one or more computer programs are stored in the memory, and the one or more computer programs, when executed by the one or more processors, cause the electronic device to implement the support interaction method in the previous embodiments.

Exemplarily, a chip system is provided according to the present disclosure, which is applied to an electronic device including a memory and a sensor. The chip system includes a processor. The processor is configured to perform the support interaction method in the previous embodiment.

Exemplarily, a computer readable storage medium on which a computer program is stored is provided according to the present disclosure. The computer program, when executed by a processor, causes an electronic device to implement the support interaction method in the previous embodiments.

Exemplarily, a computer program product is provided according to the present disclosure. The computer program product, when executed on a computer, causes the computer to perform the support interaction method in the previous embodiments.

In the above embodiments, all or part of the functions may be implemented by software, hardware, or a combination of software and hardware. When the embodiments are implemented by using software, all or some of the embodiments may be implemented in a form of a computer program product. The computer program product includes one or more computer instructions. When the computer program instructions are loaded and executed on a computer, all or some of the processes or functions according to the embodiments of the present disclosure are produced. The computer may be a general-purpose computer, a special-purpose computer, a computer network, or another programmable apparatus. The computer instructions may be stored in a computer readable storage medium. The computer readable storage medium may be any available medium capable of being accessed by a computer or include one or more data storage devices integrated by an available medium, such as a server and a data center. The available medium may be a magnetic medium (such as a floppy disk, a hard disk, or a magnetic tape), an optical medium (such as a DVD), a semiconductor medium (such as a solid state disk (SSD)) or the like.

It should be noted that the relational terms "first", "second" and the like in the present disclosure are used for distinguishing an entity or operation from another entity or operation, rather than requiring or implying an actual relationship or order between these entities or operations. Further, the terms "include", "comprise" or any variant thereof are intended to encompass nonexclusive inclusion so that a process, method, article or apparatus including a series of elements includes not only those elements but also other elements which have not been listed definitely or an element (s) inherent to the process, method, article or apparatus. Unless expressively limited otherwise, a process, method, article or apparatus limited by "comprising/including a(an)

... " does not exclude existence of another identical element in such process, method, article or apparatus.

The above are only specific implementations of the present disclosure, such that those skilled in the art can understand or implement the present disclosure. It is apparent for those skilled in the art to make various modifications to these embodiments. The general principle defined herein may be applied to other embodiments without departing from the spirit or the scope of the present disclosure. Therefore, the present disclosure is not limited to the embodiments illustrated herein, but should be defined by the broadest scope consistent with the principle and novel features disclosed herein.

The invention claimed is:

1. An interaction method, comprising:

displaying a playing interface of a video program in an application;

in response to a first object in the video program appearing in the playing interface, displaying a first component in display period of the first object in the playing interface, wherein the first component is configured to devote support to the first object;

in the display period, receiving a first operation performed by a user on the first component; and in response to the first operation, displaying, in the first component, number of supports devoted by the user to the first object;

wherein in response to the first object being not appearing in the playing interface, the first component is not displayed in the playing interface to prevent the user from devoting support to the first object.

2. The method according to claim 1, further comprising:

displaying, in the first component, a support cumulative result and a ranking of the first object.

3. The method according to claim 1, further comprising:

in a case that number of times that the user consecutively performs the first operation on the first component is within a preset range, displaying the first component in an effect corresponding to the preset range.

4. The method according to claim 1, further comprising:

displaying a first control;

receiving a second operation performed by the user on the first control; and in response to the second operation, displaying a leaderboard interface, wherein the leaderboard interface comprises support cumulative results and rankings of all objects who have appeared in played segments of the video program.

5. The method according to claim 4, further comprising:

displaying a second control on the leaderboard interface, wherein the second control is configured to devote support to the first object in a support time period of the video program;

in the support time period, receiving a third operation performed by the user on the second control; and in response to the third operation, updating the support cumulative result and the ranking of the first object in the leaderboard interface.

6. The method according to claim 4, further comprising:

displaying a third control on the leaderboard interface, wherein the third control is configured to associate with a social account of the first object beyond a support time period of the video program;

beyond the support time period, receiving a fourth operation performed by the user on the third control; and in response to the fourth operation, associating with the social account of the first object in the application.

7. The method according to claim 1, wherein the displaying the first component comprises:

displaying the playing interface in a first area and displaying the first component in a second area, wherein the first area and the second area do not overlap with each other.

8. The method according to claim 7, further comprising:

displaying, in the second area, a comment content of a user who has watched the video program.

9. The method according to claim 1, wherein the displaying the first component comprises:

displaying the playing interface in full screen and displaying the first component on the playing interface.

10. The method according to claim 7, wherein the first component comprises a third area and a fourth control;

the third area is configured to display an avatar of the first object, a name of the first object and a name of a performance content of the first object; and the fourth control is configured to devote support to the first object in the display period and display remaining number of supports of the user.

11. The method according to claim 7, wherein the first component comprises a fourth area and a fifth control;

the fourth area is configured to display an avatar of the first object, a name of the first object, a name of a performance content of the first object and a support cumulative result of the first object; and the fifth control is configured to devote support to the first object in the display period and display remaining number of supports of the user.

12. An electronic device, comprising:

one or more processors;

a memory; and one or more computer programs, wherein the one or more computer programs are stored in the memory, and the one or more computer programs, when executed by the one or more processors, cause the electronic device to implement:

displaying a playing interface of a video program in an application;

in response to a first object in the video program appearing in the playing interface, displaying a first component in a display period of the first object in the playing interface, wherein the first component is configured to devote support to the first object;

in the display period, receiving a first operation performed by a user on the first component; and in response to the first operation, displaying, in the first component, number of supports devoted by the user to the first object;

wherein in response to the first object being not appearing in the playing interface, the first component is not displayed in the playing interface to prevent the user from devoting support to the first object.

13. A non-transitory computer storage medium comprising computer instructions, wherein the computer instructions, when executed on an electronic device, cause the electronic device to implement:

displaying a playing interface of a video program in an application;

in response to a first object in the video program appearing in the playing interface, displaying a first component in a display period of the first object in the playing interface, wherein the first component is configured to devote support to the first object;

in the display period, receiving a first operation performed by a user on the first component; and in response to the first operation, displaying, in the first component, number of supports devoted by the user to the first object;

wherein in response to the first object being not appearing in the playing interface, the first component is not displayed in the playing interface to prevent the user from devoting support to the first object.

14. The electronic device according to claim 12, wherein the electronic device is further caused to implement:

in a case that number of times that the user consecutively performs the first operation on the first component is within a preset range, displaying the first component in an effect corresponding to the preset range.

15. The electronic device according to claim 12, wherein the electronic device is further caused to implement:

displaying a first control;

receiving a second operation performed by the user on the first control; and in response to the second operation, displaying a leaderboard interface, wherein the leaderboard interface comprises support cumulative results and rankings of all objects who have appeared in played segments of the video program.

16. The electronic device according to claim 15, wherein the electronic device is further caused to implement:

displaying a second control on the leaderboard interface, wherein the second control is configured to devote support to the first object in a support time period of the video program;

in the support time period, receiving a third operation performed by the user on the second control; and in response to the third operation, updating the support cumulative result and the ranking of the first object in the leaderboard interface.

17. The electronic device according to claim 15, wherein the electronic device is further caused to implement:

displaying a third control on the leaderboard interface, wherein the third control is configured to associate with a social account of the first object beyond a support time period of the video program;

beyond the support time period, receiving a fourth operation performed by the user on the third control; and in response to the fourth operation, associating with the social account of the first object in the application.

18. The electronic device according to claim 12, wherein the electronic device is further caused to implement:

displaying the playing interface in a first area and displaying the first component in a second area, wherein the first area and the second area do not overlap with each other.

19. The electronic device according to claim 18, wherein the electronic device is further caused to implement:

displaying, in the second area, a comment content of a user who has watched the video program.

20. The method according to claim 1, wherein devoting support to the first object comprises voting for the first object, and the number of supports comprises number of votes.

* * * * *